(12) United States Patent
Martin

(10) Patent No.: US 11,166,512 B2
(45) Date of Patent: Nov. 9, 2021

(54) SMART HELMET

(71) Applicant: Donald K Martin, Columbus, OH (US)

(72) Inventor: Donald K Martin, Columbus, OH (US)

( * ) Notice: Subject to any disclaimer, the term of this patent is extended or adjusted under 35 U.S.C. 154(b) by 368 days.

(21) Appl. No.: 16/271,788

(22) Filed: Feb. 9, 2019

(65) Prior Publication Data
US 2019/0166945 A1    Jun. 6, 2019

Related U.S. Application Data

(63) Continuation-in-part of application No. 15/388,080, filed on Dec. 22, 2016, now Pat. No. 10,244,810.

(51) Int. Cl.
| | | |
|---|---|---|
| *A42B 3/12* | (2006.01) | |
| *G06F 17/18* | (2006.01) | |
| *A42B 3/04* | (2006.01) | |
| *G06N 7/00* | (2006.01) | |
| *A42B 3/28* | (2006.01) | |

(52) U.S. Cl.
CPC .............. *A42B 3/122* (2013.01); *A42B 3/046* (2013.01); *A42B 3/28* (2013.01); *G06F 17/18* (2013.01); *G06N 7/00* (2013.01); *A42B 3/0486* (2013.01)

(58) Field of Classification Search
CPC ....... A42B 3/046; A42B 3/0486; A42B 3/121; A42B 3/122; A42B 3/28; A63B 71/081; G06F 17/18; G06N 7/00
See application file for complete search history.

(56) References Cited

U.S. PATENT DOCUMENTS

| | | | | |
|---|---|---|---|---|
| 8,127,373 B1 * | 3/2012 | Fodemski | .............. | A42B 3/121 |
| | | | | 2/413 |
| 9,007,217 B1 * | 4/2015 | Anvari | .................. | H01Q 21/28 |
| | | | | 340/573.1 |
| 9,730,482 B2 * | 8/2017 | Allen | .................... | A42B 3/0406 |
| 9,788,588 B2 * | 10/2017 | Allen | ........................ | A42B 3/12 |
| 10,244,810 B2 * | 4/2019 | Martin | .................... | A42B 3/046 |
| 2007/0190293 A1 * | 8/2007 | Ferrara | .................. | B32B 3/266 |
| | | | | 428/166 |
| 2012/0304367 A1 * | 12/2012 | Howard | ................. | A42B 3/046 |
| | | | | 2/413 |
| 2014/0000011 A1 * | 1/2014 | Johnson | ................. | A42B 3/046 |
| | | | | 2/413 |
| 2018/0027894 A1 * | 2/2018 | Bangera | ............... | A41D 31/285 |

* cited by examiner

*Primary Examiner* — Ryan A Reis

(57) ABSTRACT

Systems, methods, and devices for protecting a user head are provided.
In one example, a computer-implemented method can comprise receiving, by a processor operatively coupled to a helmet device, helmet data comprising at least one of statistical data, statistical models, or natural intelligence algorithms. The computer-implemented method can also comprise inflating, by a gas delivery system of the helmet device, a pressure chamber element of the helmet device based on the helmet data. Furthermore, the computer-implemented method can comprise scanning, by a sensor system of the helmet device, surrounding environments of the helmet device for object data.

20 Claims, 15 Drawing Sheets

SMART HELMET

CROSS REFERENCED TO RELATED APPLICATION

This application claims the benefit of U.S. Non-Provisional patent application Ser. No. 15/388,080, filed on Dec. 22, 2016 and entitled "Smart Helmet" U.S., which claims the benefit of U.S. Provisional Patent Application No. 62/387,312, filed Dec. 23, 2015, and entitled "SMART HELMET", the entirety of which application is hereby incorporated by reference herein.

BACKGROUND

The subject disclosure relates to protective equipment and in particular to a protective helmet. Protective equipment may be used by athletes in sports, soldiers in various military branches, professionals in their trade, etc. One area of the body for which protective equipment is used is the head. Protective equipment for the head, such as protective helmets, may be designed to provide varying levels of protection depending on the circumstances surrounding the use. Some factors that can be considered in the design of protective helmets, and protective equipment generally, are the environment of use, the type of injury for which protection is being provided, weight, and appearance among other things.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, apparatuses, and/or computer-implemented methods that facilitate automatically adjusting braking systems of various vehicles.

According to one embodiment, a computer-implemented method can comprise receiving, by a processor operatively coupled to a helmet device, helmet data comprising at least one of statistical data, statistical models, or natural intelligence algorithms. Furthermore, the method can comprise inflating, by a gas delivery system of the helmet device, a pressure chamber element of the helmet device based on the helmet data. Furthermore, the method can comprise scanning, by a sensor system of the helmet device, surrounding environments of the helmet device for object data.

Figure 1:
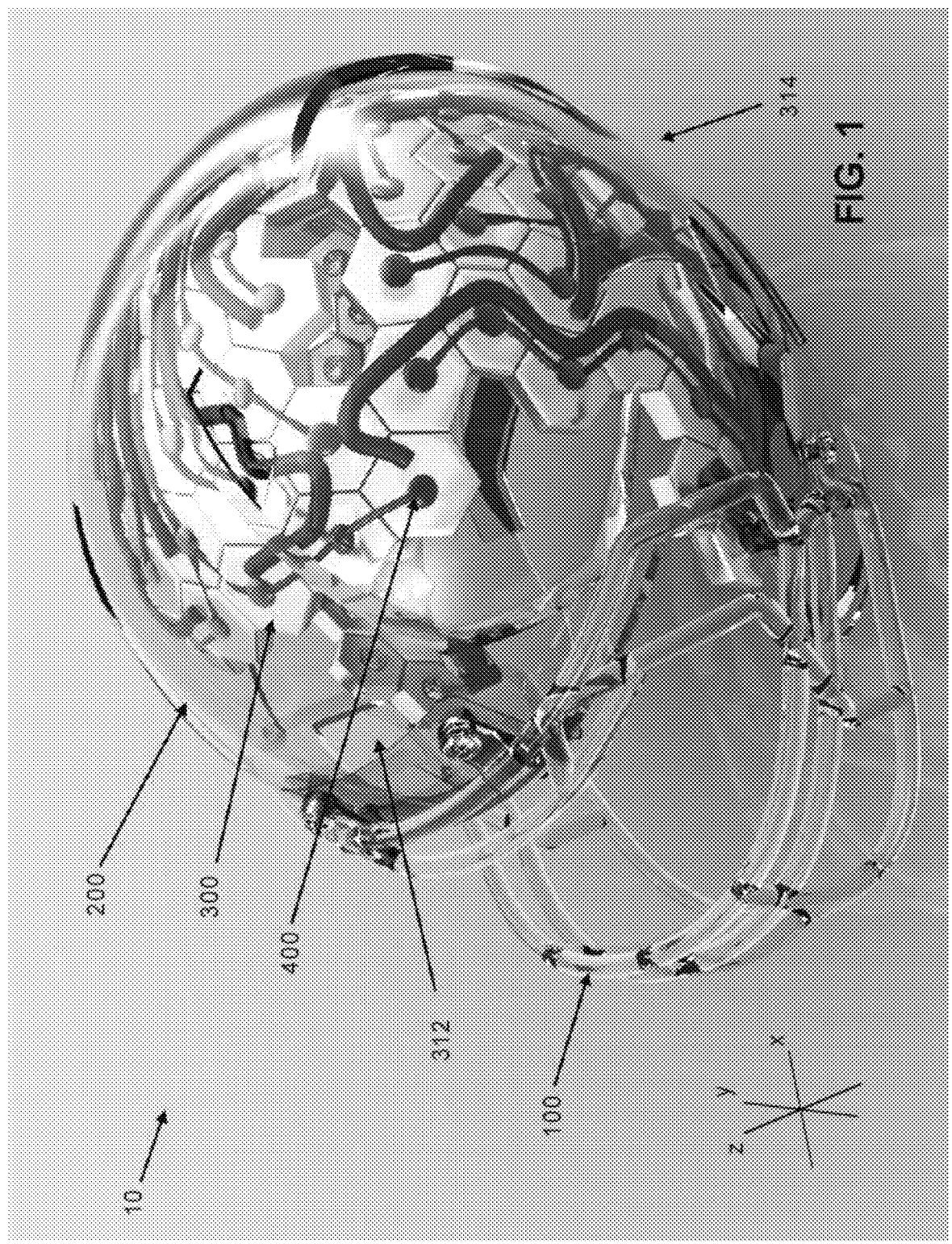
FIG. 1 illustrates a perspective view of a non-limiting example protective helmet in the form of a football helmet. in accordance with one or more embodiments described herein.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure is directed to systems, devices, apparatuses, and/or computer-implemented methods that facilitate the protection of a user. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates an exemplary article of protective equipment in the form of a protective helmet (10). The helmet (10) comprises a facemask (100), an outer shell (200), and a protection layer (300). The facemask (100) may be comprised of plastic, metal, or rubber-coated metal. Other materials for the facemask (100) will be apparent to those of ordinary skill in the art in view of the teachings herein. In some versions the facemask (100) may be omitted or replaced with other protective equipment like a face-shield etc. The outer shell (200) may be comprised of one or more plastics and may be constructed in a single layer or multiple layers. In view of the teachings herein, other materials and configurations for the outer shell (200) will be apparent to those of ordinary skill in the art.

Figure 2:
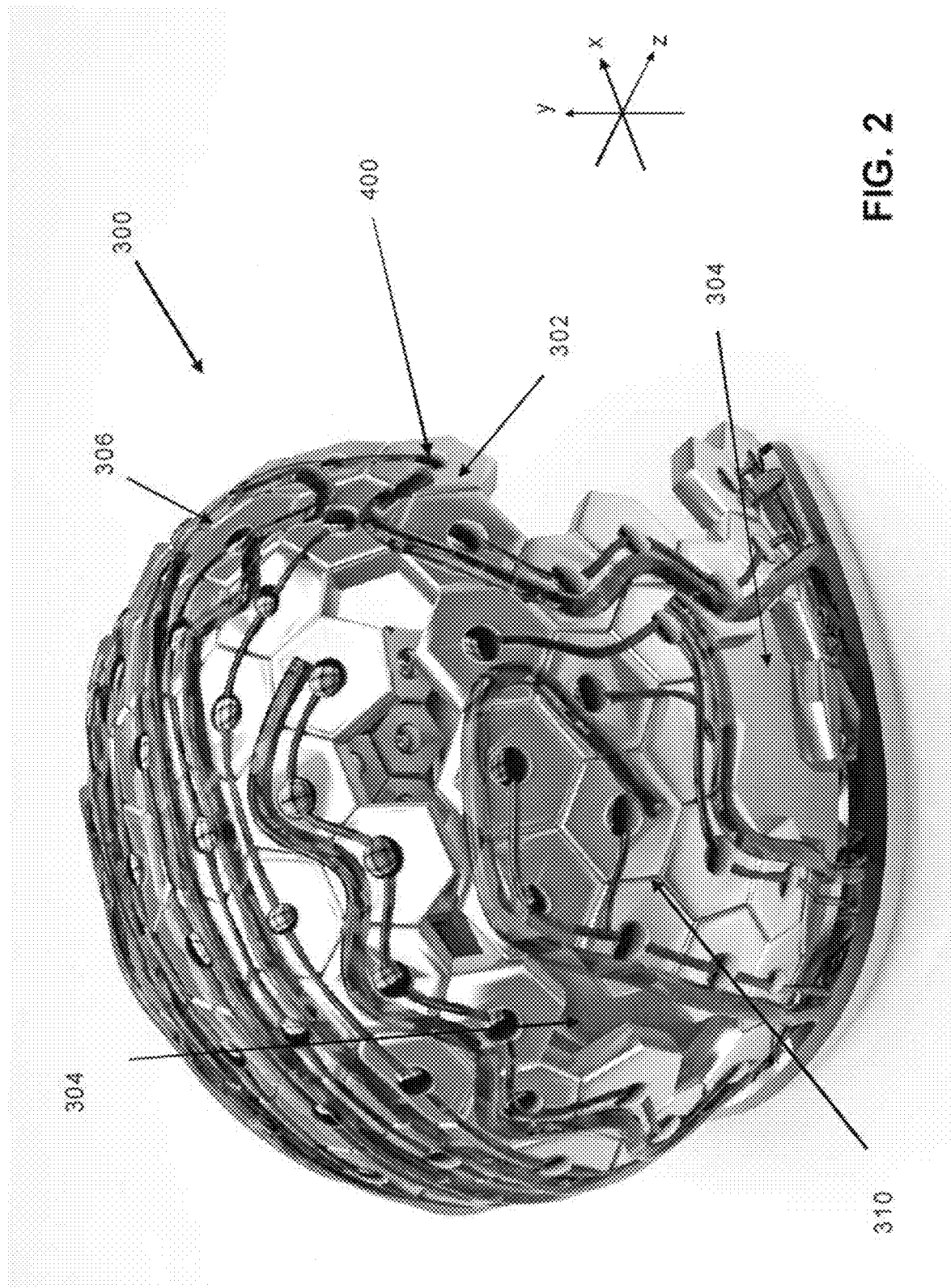
FIG. 2 illustrates a perspective view of the helmet of FIG. 1, shown with an outer shell and facemask removed in accordance with one or more embodiments described herein.
Figure 3:
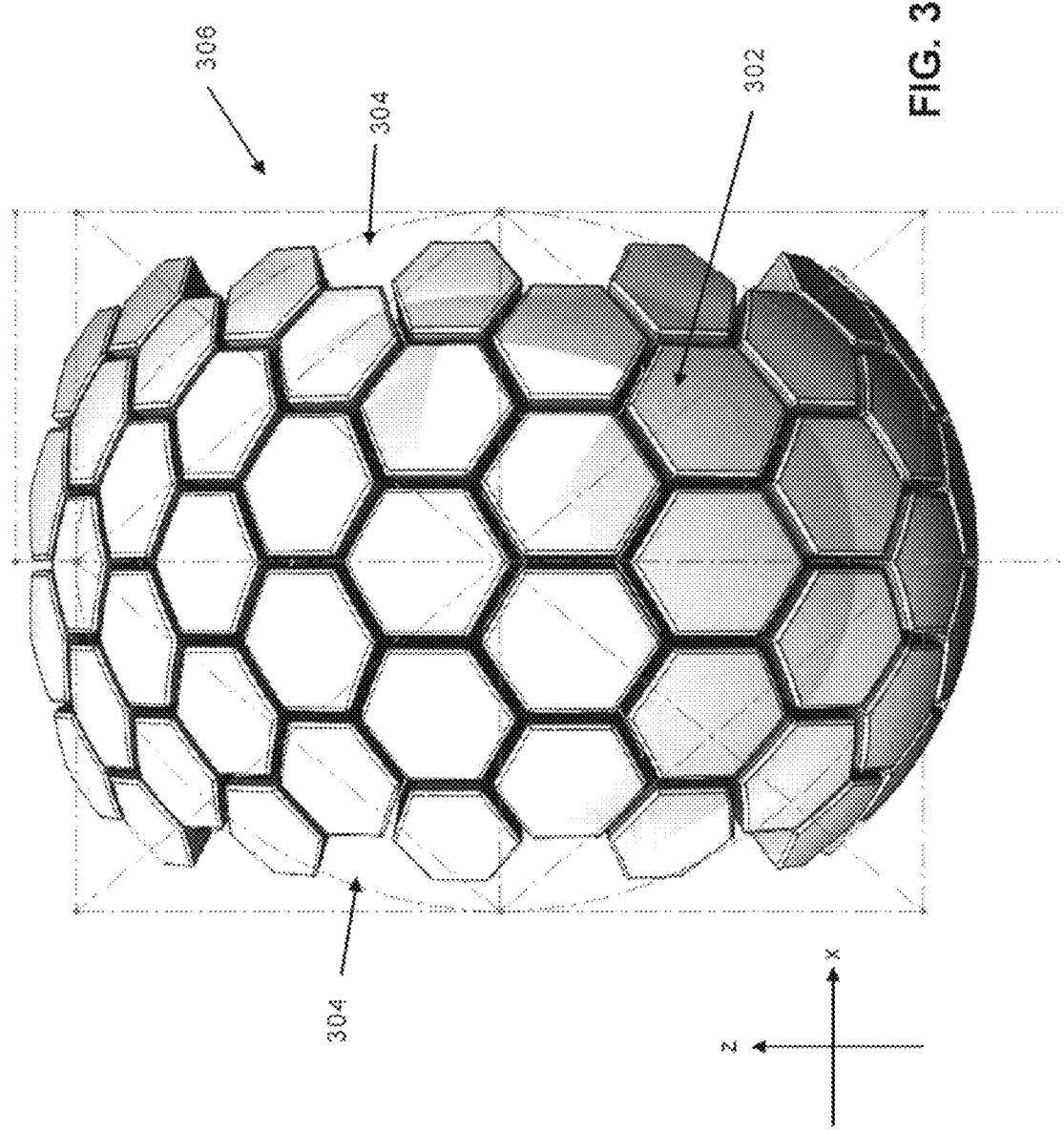
FIG. 3 illustrates a top view of a plurality of cells of the helmet of FIG. 2 in accordance with one or more embodiments described herein.

FIGS. 2 and 3 illustrate the protection layer (300). In the present example, the protection layer (300) is positioned along an interior of the outer shell (200). The protection layer (300) comprises a plurality of cells (302) that have a hexagonal shape. The hexagonal shape for the plurality of cells (302) is not required, and in other versions the shape of the plurality of cells (302) can differ. In the present example, the protection layer (300) comprises openings (304). The openings (304) provide for space between regions defined by the plurality of cells (302). In the present example, the plurality of cells (302) comprises a central region (306), a right region (308), and a left region (310). As shown in the present example, the central region (306) connects with the right region (308) and the left region (310) along a front portion (312) and rear portion (314) of the helmet (10). In some version of the helmet (10), the openings (304) are omitted such that the plurality of cells (302) provides a continuous network for the protection layer (300).

Figure 4:
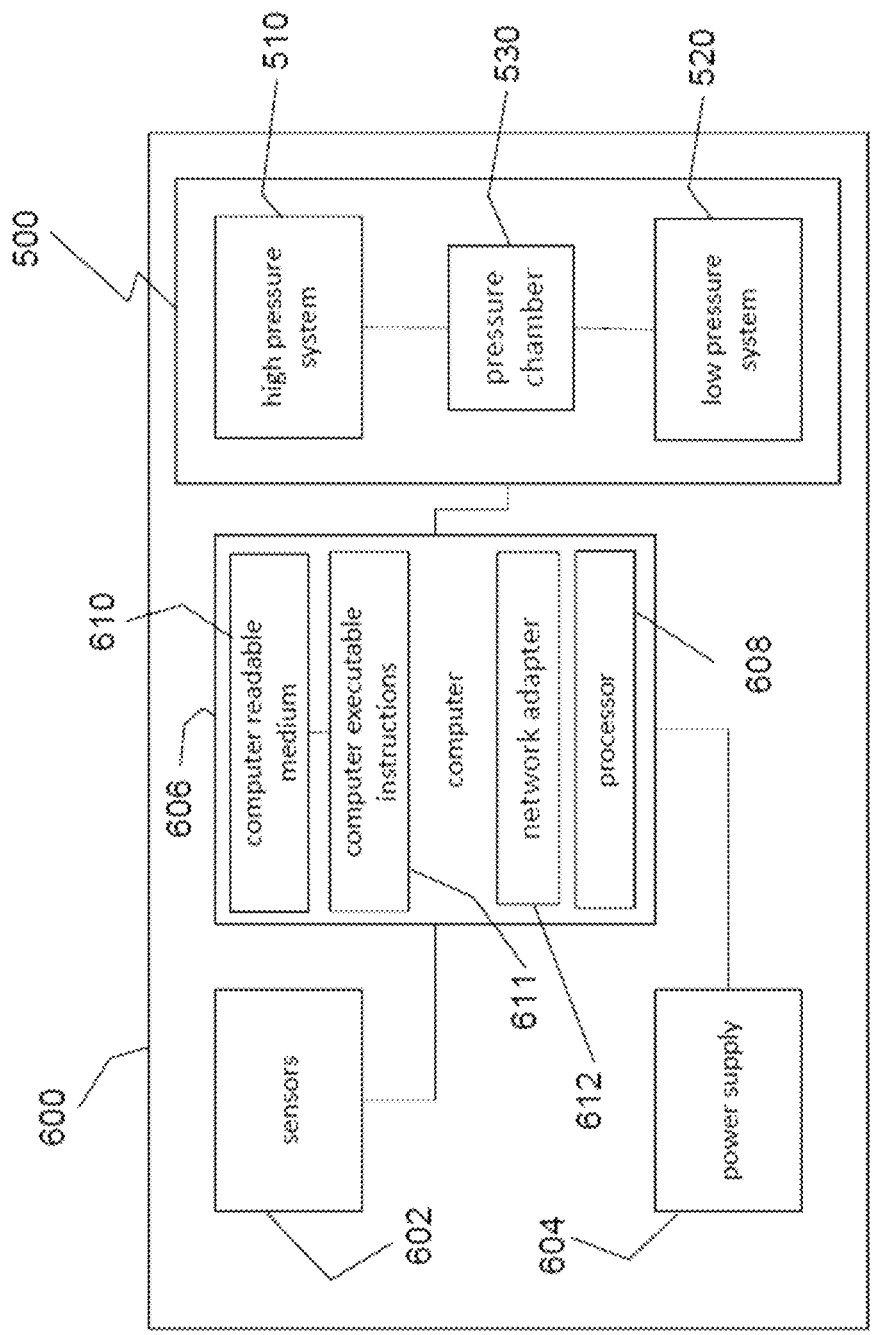
FIG. 4 illustrates a block diagram of a control system of the helmet of FIG. 1 in accordance with one or more embodiments described herein.

FIG. 4 illustrates an exemplary control system (600) for use with the helmet (10). The control system (600) comprises one or more sensors (602), a power supply (604), and a computer (606), which includes a processor (608), a computer readable medium (610), and a network adapter (612). Also illustrated within the control system (600) is a gas delivery system (500) with its high-pressure system (510), low-pressure system (520), and a pressure chamber (530). The gas delivery system (500) and its components will be described in greater detail below.

In the present example, the sensors (602) are operable to detect motion of surrounding objects. The sensors (602) detect this motion from 360 degrees around the helmet (10). The sensors (602) are configured to provide continuous scanning and detection during an event such as a football game, etc. In one example, the sensors (602) detect motion for surrounding objects such as players in a football game. In doing so, the sensors (602) detect the speed and direction of these objects. In one example, the sensors (602) comprise laser detection and ranging (LADAR) sensors that can be used to detect the motion of objects as well as generate 2D and/or 3D images of those objects for use in other calculations, e.g. mass calculations. The information collected by the sensors (602) is inputted into the computer (606) and calculations can be made using this information as will be described below. In view of the teachings herein, other types of sensors (602) and information detectable by the sensors (602) will be apparent to those of ordinary skill in the art.

The power supply (604) is operable to provide power to the control system (600). For instance, the power supply (604) provides power to the computer (606) as well as the sensors (602) and the gas delivery system (500). In some examples the power supply (604) comprises one or more capacitors. In some other examples the power supply (604) comprises one or more batteries that may be rechargeable or single use. In still other examples more than one type of power supply (604) may be used. The power supply (604) further comprises electrical communication ability such that the power can be transmitted or delivered to the associated components, e.g. the high-pressure system (510) and the low-pressure system (520). The electrical communication ability in some examples comprises various electrical wiring or non-wired wi-fi or other non-wired connections between and among the components. In view of the teachings herein, those of ordinary skill in the art will appreciate other types of power supply (604) for use with the control system (600) as well as other types and ways of transmitting power from the power supply (604) to the other components.

The computer (606) includes the processor (608), the computer readable medium (610), and the network adapter (612). The computer readable medium (610) is configured to store computer executable instructions (611) that may be used in calculations and control of the sensors (602) and gas delivery system (500) of the helmet (10). The processor (608) is operable to execute the instructions (611) stored on the computer readable medium (610). The network adapter (612) is operable to connect the computer (606) with a network for communication between the computer (606) within the helmet (10) and other locations also connected with the network. In some examples the network may be a local area network (LAN), a wide area network (WAN) such as the Internet, or any other network that will be apparent to those of ordinary skill in the art in view of the teachings herein. The connection to the network via the network adapter (612) occurs wirelessly in the present example, but in other non-limiting examples the network adapter (612) can instead or in addition use wired connectivity. In another non-limiting embodiment, network adaptor (612) can employ (LIDAR) or other light or other technologies not limiting the communications to the identified methods to facilitate communication between helmets and between larger capacity computers that are located outside of the environment.

In the present example, the computer (606) comprises a soft circuit board construction that is positionable within the helmet (10). In one example the soft circuit board configuration for the computer (606) is positioned in a top or lower back or both inside of the helmet (10). In other examples the computer is not limited to having a soft circuit board construction. In some examples, the soft circuit board may contain the power supply (604), but the power supply (604) may be located separate from the soft circuit board and connect with it through various wiring connections that will be apparent to those of ordinary skill in the art in view of the teachings herein.

Other features that may be included with the helmet (10) include a GPS module that is used to provide location information for each helmet (10). In such an example using GPS modules in the helmets (10), the position information for the helmets (10) can be shared among the helmets (10). In other non-limiting embodiments, data representing knowledge acquired by other helmets can be utilized and/or applied to other helmets in various capacities such as anticipating or collectively anticipating threats of impact or multiple simultaneous threats of impact from several helmets. In one version this position information can be transmitted among the helmets (10) using (LIDAR) or other light systems or wireless network adapter[s] (612). In other versions, (LIDAR) or other light systems and/or Bluetooth or near field communication (NFC) can be used to share the position information among the helmets (10) in a defined area or range.

Figure 5:
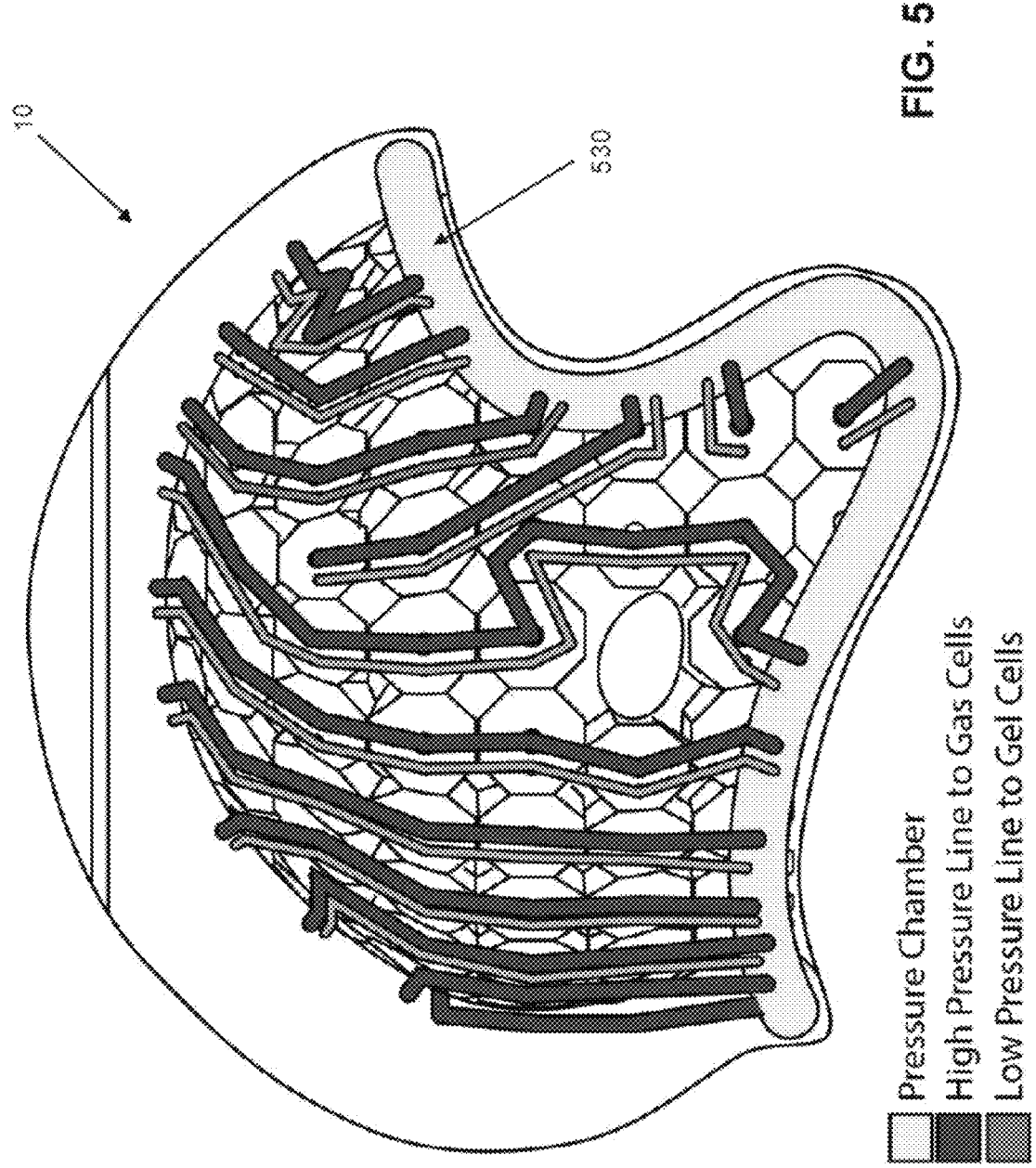
FIG. 5 illustrates a side view of the helmet of FIG. 1, shown with a portion of the outer shell cut away to reveal internal components of the helmet in accordance with one or more embodiments described herein.

As mentioned above, the gas delivery system (500) includes the high-pressure system (510), the low-pressure system (520), and the pressure chamber (530). The gas delivery system (500) is controlled by the computer (606) to direct calculated volumes of gas to variable pressure valve assemblies (400) of the plurality of cells (302). In this example, each cell (302) includes a two valve assemblies; a high-pressure valve assembly located in the center of the piston/cell and a low-pressure system that inflates the independent piston/cell valve assemblies (400). Each valve assembly (400) connects independently with the high-pressure system (510) and low-pressure system (520). As shown in FIG. 5, the high-pressure system (510) and the low-pressure system (520) connect independently with the pressure chamber (530). In a non-limiting embodiment, the gas contained within the pressure chamber (530) can be released to portions of the high-pressure system first based on a determined probability of impact (510), the low-pressure system engages within a micro-second with the computer controlling a concentric release of pressure from the center of concentric field piston/cells to engage of 180 degrees of surface area to the cranium pushing slightly against the cranium in opposite direction from the high-pressure system (520), as directed by the computer (606). In the present example, to control the flow of gas within the gas delivery system (500) and helmet (10) generally, the computer (606) controls a plurality of valves (540) that connect the pressure chamber (530) with the high-pressure system (510) and the low-pressure system (520).

The configuration of the valves as well as the arrangements for connecting the high-pressure system (510) and the low-pressure system (520) with the pressure chamber (530) will be described in greater detail below.

Figure 6:
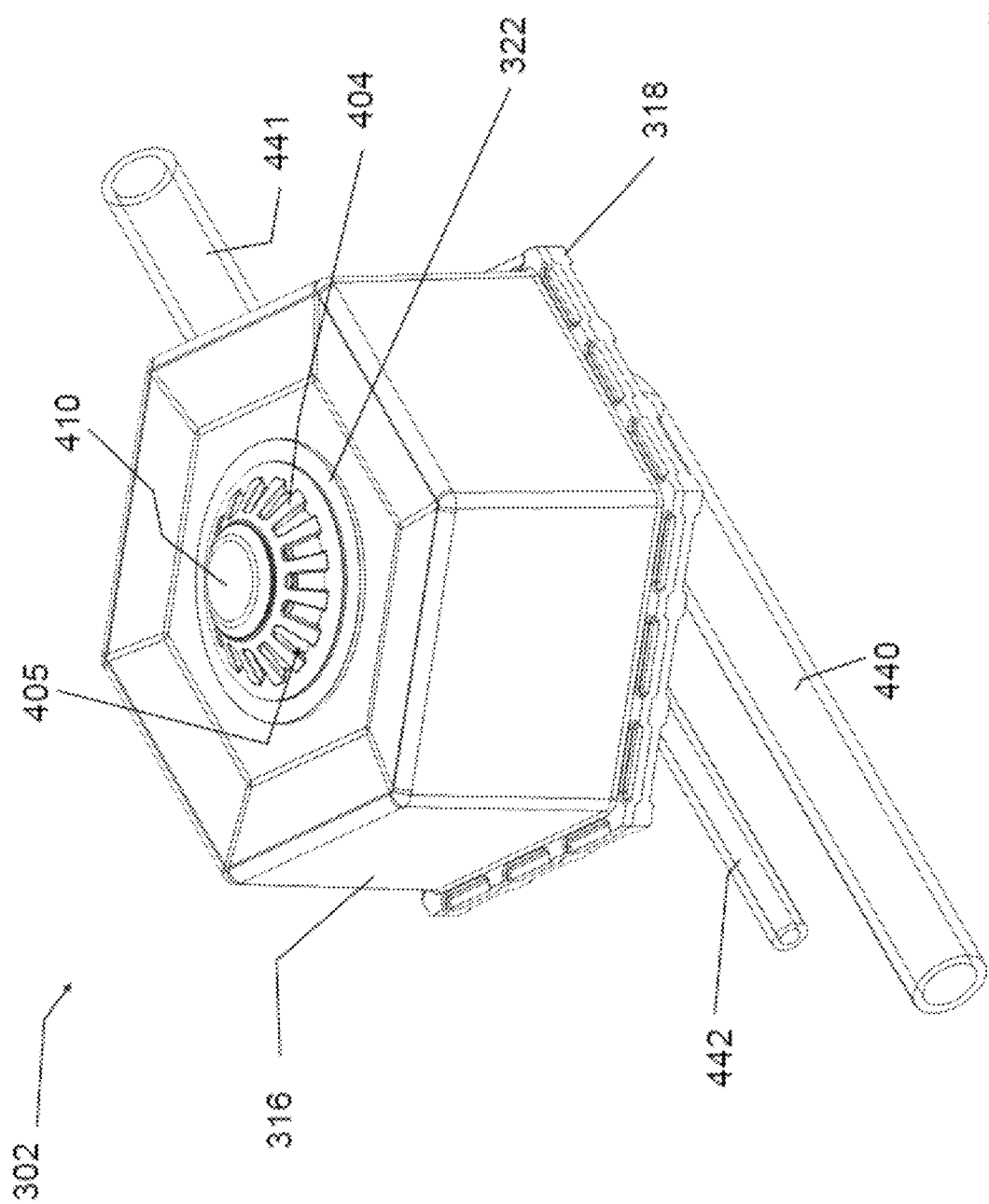
FIG. 6 illustrates a perspective view of one of the plurality of cells of FIG. 3 in accordance with one or more embodiments described herein.
Figure 7:
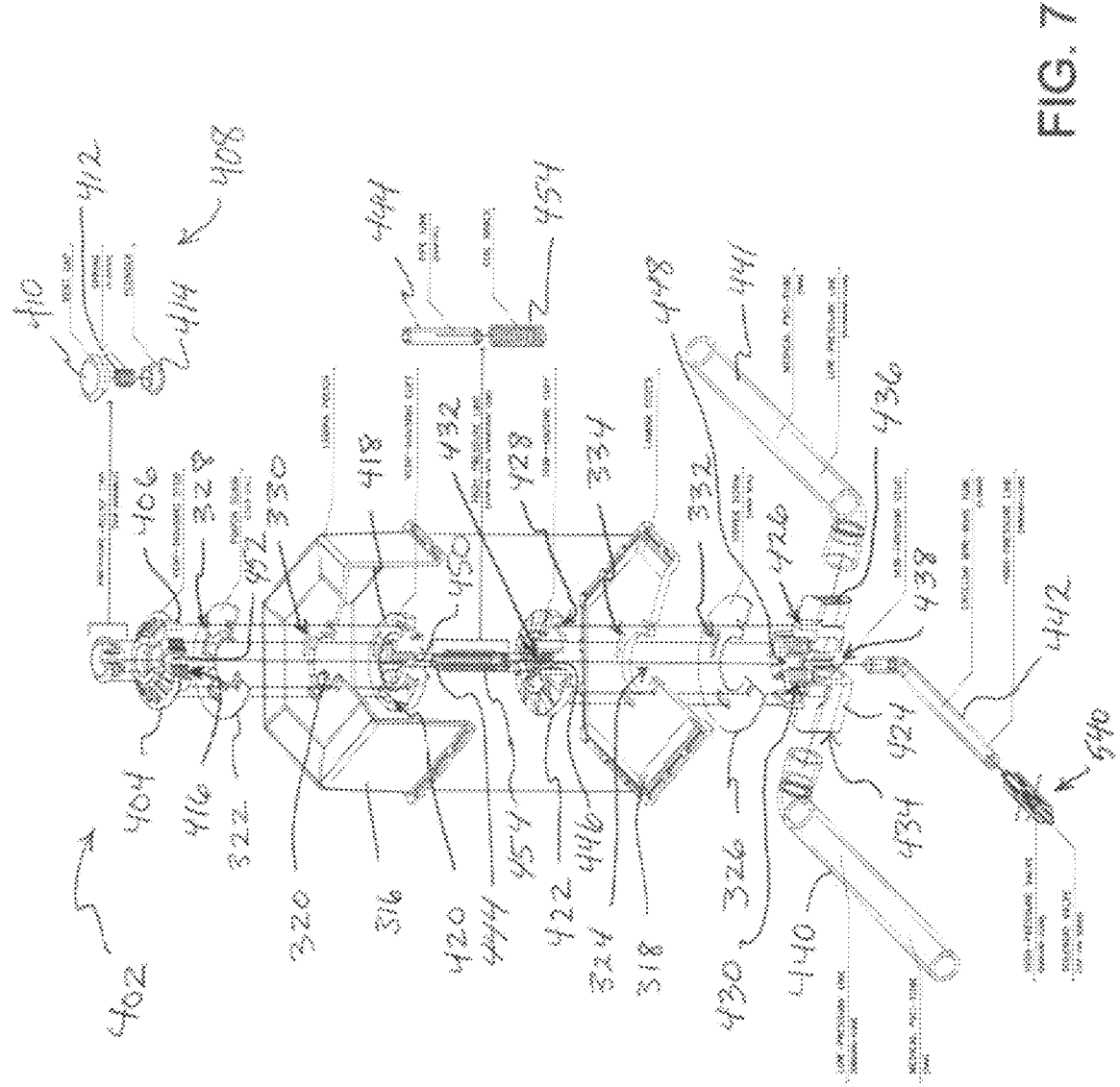
FIG. 7 illustrates an exploded view of the valve assembly of FIG. 6 in accordance with one or more embodiments described herein.

FIGS. 6-9 illustrate views of one of the cells (302) and one of the valve assemblies (400) connected therewith. In the present example each of the piston-cells (302) would have the same or similar structure as that illustrated in FIGS. 6-9. Referring first to FIGS. 6 and 7, each piston-cell (302) comprises a body (316) and a base (318). The body (316) connects with the base (318) such that a hermetic seal is formed between the body (316) and the base (318). At a top surface of the body (316), there is an opening (320) that is configured to connect with a seal (322). The base (318) also includes an opening (324) that is configured to connect with a seal (326). Each seal (322, 326) has respective openings that receive portions of the valve assembly (400). More specifically, at the top surface of the body (316) a vent assembly (402) connects with the seal (322) and body (316).

As viewable in FIG. 7, in the present example the vent assembly (402) includes a stud (404) that has projections (406) that engage with slots (328) of the seal (322) and slots (330) of the body (316). The vent assembly (402) further includes a pressure release assembly (408) comprising a cap (410), spring (412), and plunger (414). The pressure release assembly (408) connects with the stud (404) and is configured to remain closed until determined to match impact energy threat within a high-pressure line (442) is reached at which point the pressure release assembly (408) opens to release gas from within the line (442).

Figure 8:
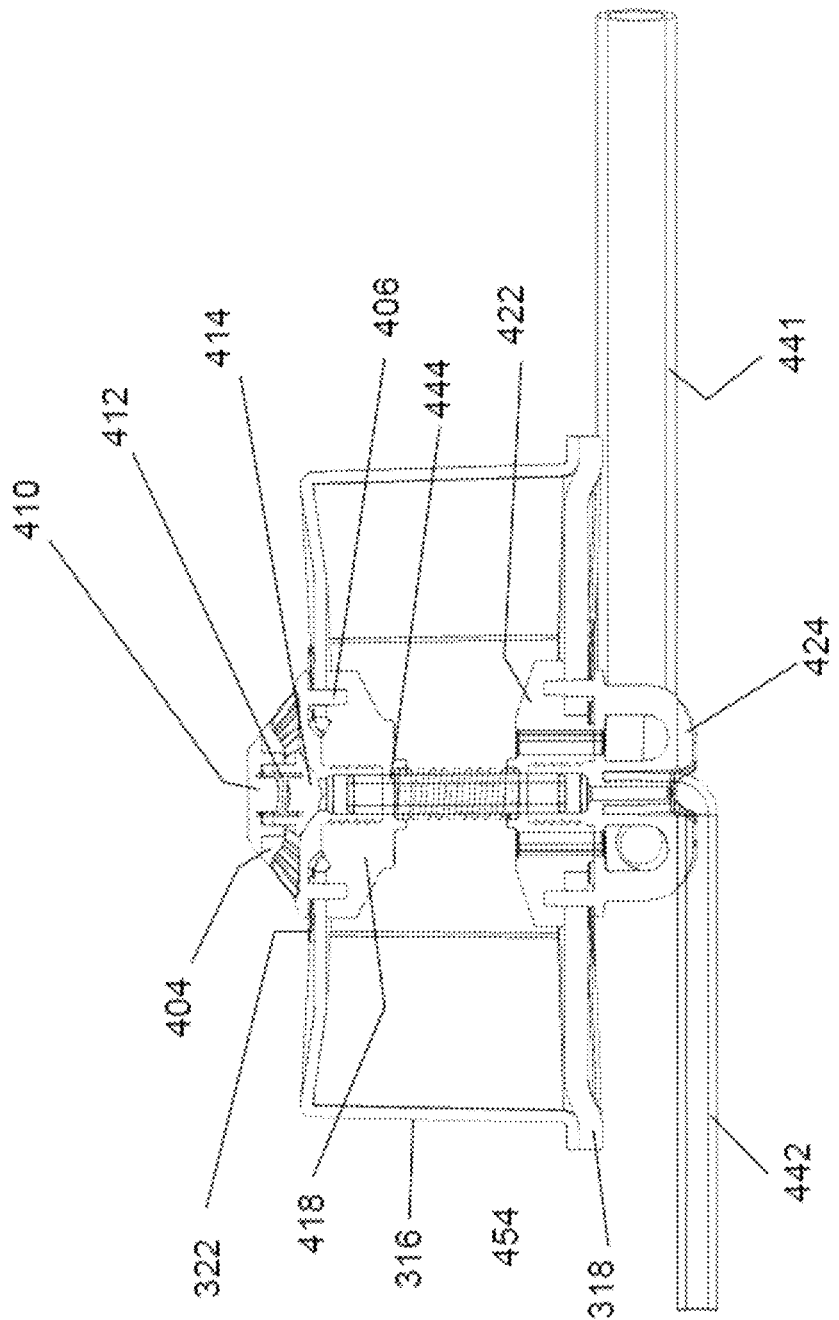
FIG. 8 illustrates a cross section view the cell of FIG. 6, shown in a first position for pressurizing the cell in accordance with one or more embodiments described herein.
Figure 9:
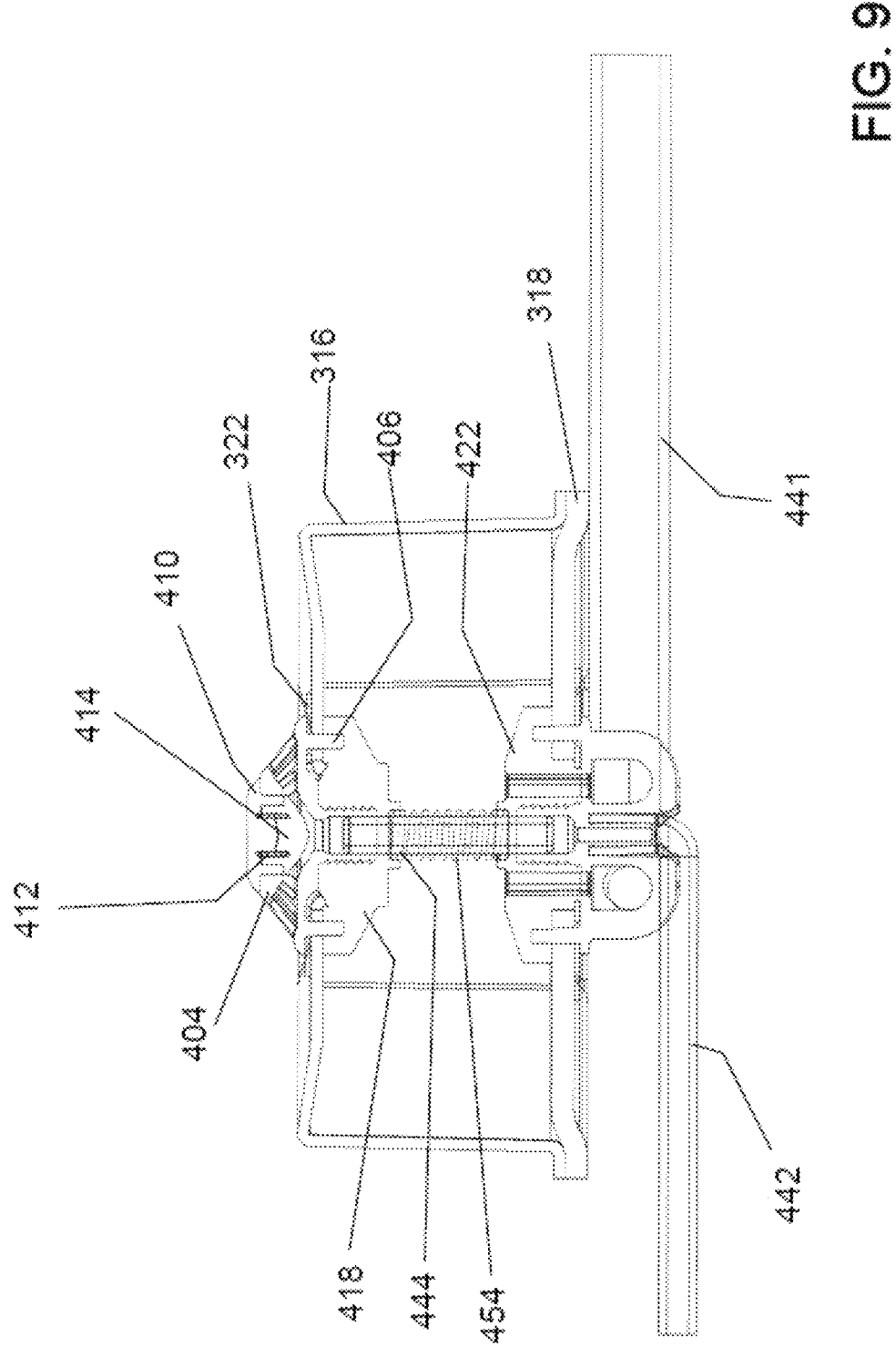
FIG. 9 illustrates a cross section view of the cell of FIG. 6, shown in a second position for releasing pressure from the cell in accordance with one or more embodiments described herein.

FIGS. 8 and 9 depict the plunger (414) in closed and open positions respectively, where the gas is released when the plunger (414) is in the open position of FIG. 9. The stud (404) includes angled slots (405) through which the gas is released from when the plunger (414) is in the open position. The angled slots (405) are configured such that the release of the gas from the valve assembly (400) occurs generally perpendicular to a longitudinal axis defined by the valve assembly (400). In this manner, the gas is released along or generally parallel with the protection layer (300) and thus a user's head. In some other versions, the gas may be released from the pressure release assembly (408) in directions other than generally perpendicular to the longitudinal axis of the valve assembly (400).

The stud (404) of the vent assembly (402) further includes threaded portions (416) along an underside portion of the stud (404). These threaded portions (416) extend through the opening in the seal (322) and through the opening (320) in the body (316). The threaded portions (416) are configured as multiple bores in the stud (404), with the bores having threads along their interior surface. An upper connection member (418) is located within the body (316) and includes threaded portions (419), which threadably connect with the threaded portions (416) of the stud (404). In the present example, the threaded connection between the upper connection member (418) and the stud (404) is such that the threaded portions (416) and the threaded portions (419) engage when the upper connecting member (418) and the stud (404) are pressed together. In this manner the threads and recesses of each of the threaded portions (416) and the threaded portions (419) operate as interlocking teeth or ridges. Furthermore, the connection among the stud (404), the seal (322), the body (316), and the upper connection member (418) creates a hermetic seal.

In this arrangement, the upper connection member (418) is positionable such that it contacts an interior of the upper part of the body (316). The upper connection member (418) further includes slots (420) that are configured to engage with the projections (406) of the stud (404). In some examples, the slots (420) and projections (406) are configured as alignment guides. In some other examples the projections (406) may be resiliently biased and have a hook feature at the end such that the projections (406) to actively engage with the upper connection member (418) to make a more secure connection between the stud (404) and the upper connection member (418). The connection among the stud (404), the seal (322), the body (316), and the upper connection member (418) creates a hermetic seal.

While the present example illustrates multiple mechanical fastening methods to connect the stud (404) with the upper connection member (418), such multiple fastening methods are not required in all versions. For instance, in some versions the upper connection member (418) may be configured without slots (420) for engaging with the projections (406) of the stud (404). In view of the teachings herein, other ways to connect the stud (404) with the upper connection member (418) to create a hermetic seal will be apparent to those of ordinary skill in the art.

As mentioned above, the base (318) includes the opening (324) that are configured to connect with the seal (326) such that the seal (326) contacts the base (318) along an underside surface of the base (318). Furthermore, the base (318) is configured to connect with a lower connection member (422) such that the lower connection member (422) contacts the base (318) along a top surface of the base (318). The seal (326) has an opening that receives portions of the valve assembly (400). More specifically, at an underside surface of the base (318), a stud (424) connects with the seal (326) and base (318). As viewable in FIG. 9, in the present example the stud (424) has projections (426) that engage with slots (332)

of the seal (326), slots (334) of the base (318), and ultimately with a slot (428) of the lower connection member (422).

In some examples, the slots (332, 334, 428) and projections (426) are configured as alignment guides. In some other examples the projections (426) may be resiliently biased and have a hook feature at the end such that the projections (426) actively engage with the lower connection member (422) to make a more secure connection between the stud (424) and the lower connection member (422).

The stud (424) further comprises threaded portions (430) that, when the valve assembly (400) is assembled, extend through the opening in the seal (326) and through the opening (324) in the base (318). The threaded portions (430) are configured as multiple partial bores in the stud (424), with the bores having threads along their interior surface. The lower connection member (422) comprises threaded portions (432) that are configured to threadably engage with the threaded portions (430) of the stud (424). In this arrangement, the lower connection member (422) is positionable such that it contacts an interior of a lower surface of the base (318). In the present example, the threaded connection between the lower connection member (422) and the stud (424) is such that the threaded portions (430) and the threaded portions (432) engage when the lower connecting member (422) and the stud (424) are pressed together. In this manner the threads and recesses of each of the threaded portions (430) and the threaded portions (432) operate as interlocking teeth or ridges. Furthermore, the connection among the stud (424), the seal (326), the base (318), and the lower connection member (422) creates a hermetic seal.

While the present example illustrates multiple mechanical fastening methods to connect the stud (424) with the lower connection member (422), such multiple fastening methods are not required in all versions and not limited to other mechanical configurations applied to different environments and needs including but not limiting to military and medical applications. For instance, in some versions the lower connection member (422) may be configured without slot (428) for engaging with the projections (426) of the stud (424). In view of the teachings herein, other ways to connect the stud (424) with the lower connection member (422) to create a hermetic seal will be apparent to those of ordinary skill in the art.

The stud (424) further comprises a low-pressure inlet (434), a low-pressure outlet (436), and a high-pressure inlet (438). The low pressure inlet (434) of each stud (424) of each cell (302) connects with an inbound flow portion of a low pressure line (440). The low-pressure outlet (436) of each cell (302) connects with an outbound flow portion of the low-pressure line (441). The high-pressure inlet (438) of each cell (302) connects with an inbound flow portion of a high-pressure line (442).

Between the upper connection member (418) and the lower connection member (422) is a connection tube (444). The connection tube (444) extends through a bore (446) of the lower connection member (422) to ultimately connect with a bore (448) of the stud (424). At the other end of the connection tube (444), the connection tube (444) extends through a bore (450) of the upper connection member (418) to ultimately connect with a bore (452) of the stud (404). With the connection tube (444) in place, the gas from the high-pressure line (442) is communicated to and through the connection tube (444) to ultimately be released from the variable pressure release assembly (408).

Surrounding the connection tube (444) is a spring (454). In the present example the spring (454) connects securely with the stud (404) at the top of the spring (454), and the spring (454) connects securely with the stud (424) at the base of the spring (454). With this configuration, the spring (454) acts as a brace to provide support to the connection tube (444). The spring (454) also acts as a brace to provide support to the cell (302) generally by maintaining a certain distance between the upper connection member (418) and the lower connection member (422) such that the cell (302) cannot collapse. In some versions, the spring (454) may be positioned between, and contact, the studs (404, 424) without requiring the spring (454) to be securely connected with the studs (404, 424).

Figure 10:
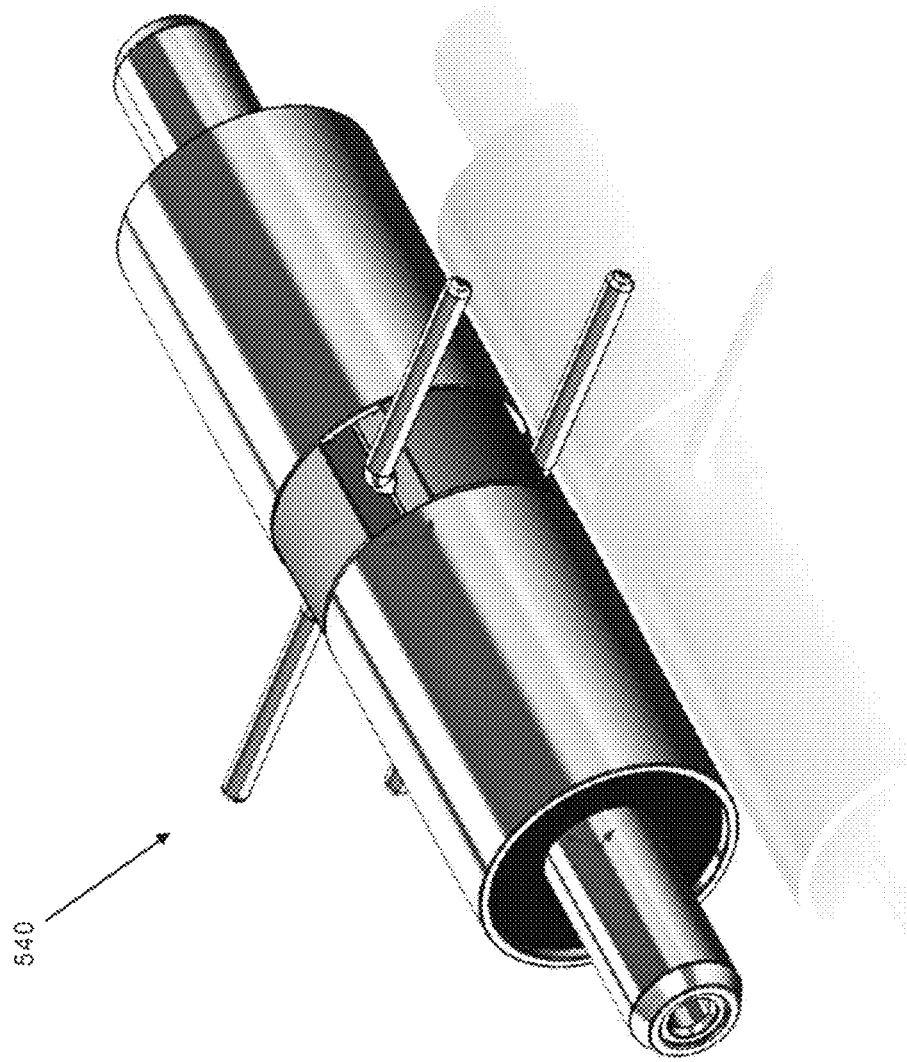
FIG. 10 illustrates a perspective view of a pressure valve of the cell of FIG. 6 in accordance with one or more embodiments described herein.
Figure 11:
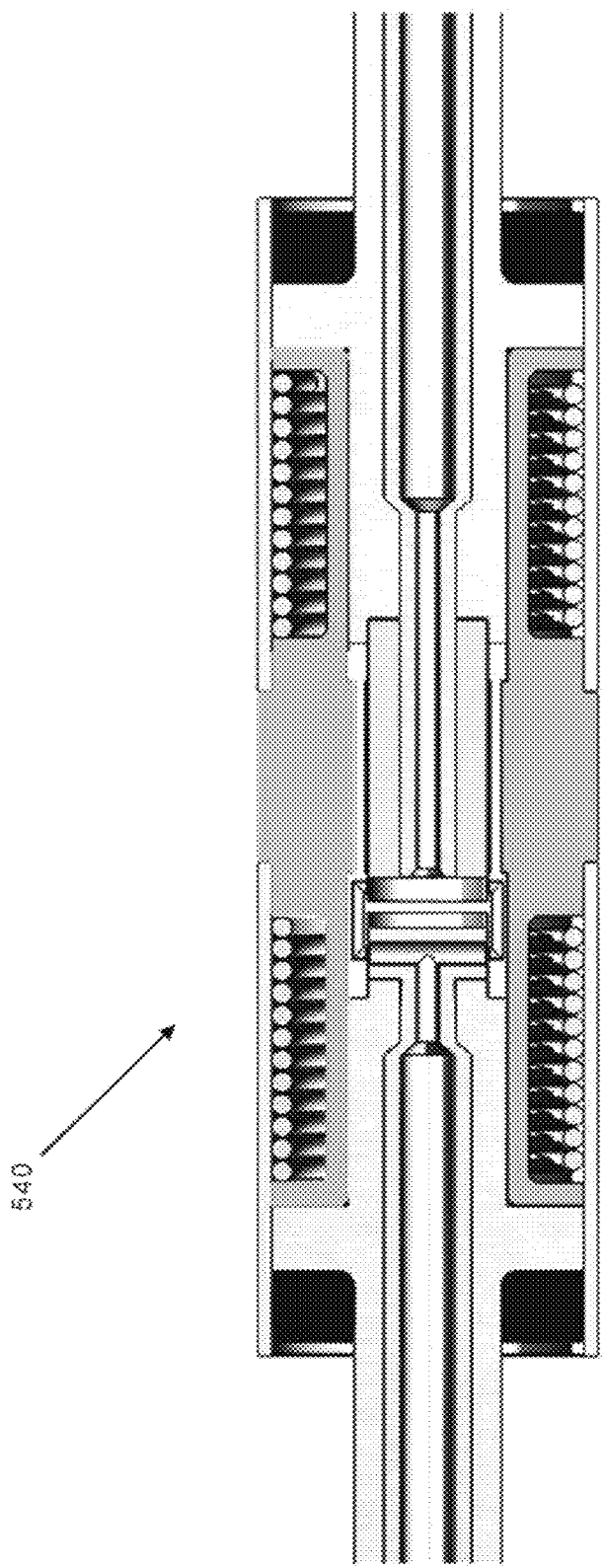
FIG. 11 illustrates a cross section view of the pressure valve of FIG. 10 in accordance with one or more embodiments described herein.
Figure 12:
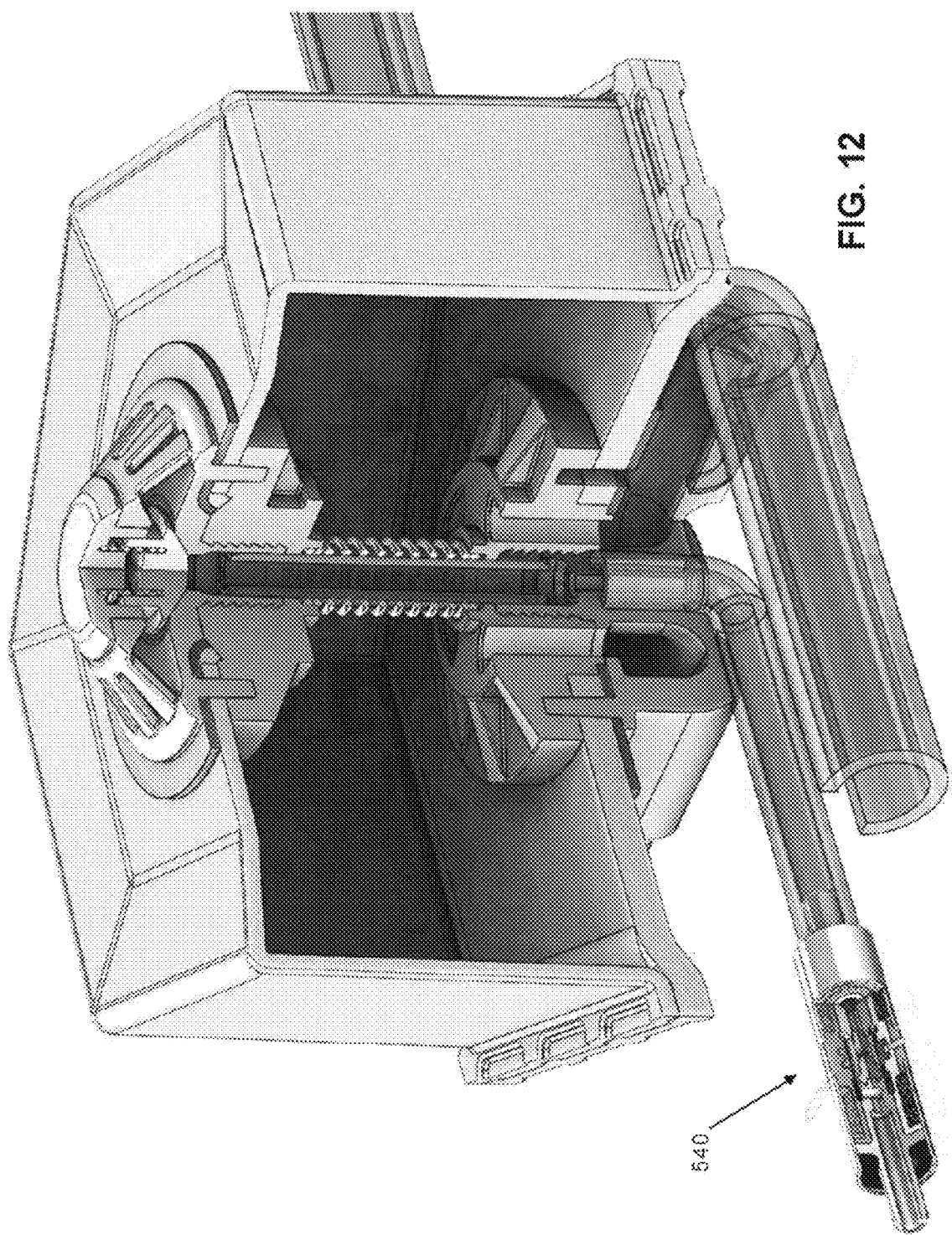
FIG. 12 illustrates a perspective view of the cell of FIG. 6, shown with portions of the cell, valve assembly, and pressure valve cut away to reveal internal components, and shown with the pressure valve positioned on the high pressure line outside of the cell in accordance with one or more embodiments described herein.
Figure 13:
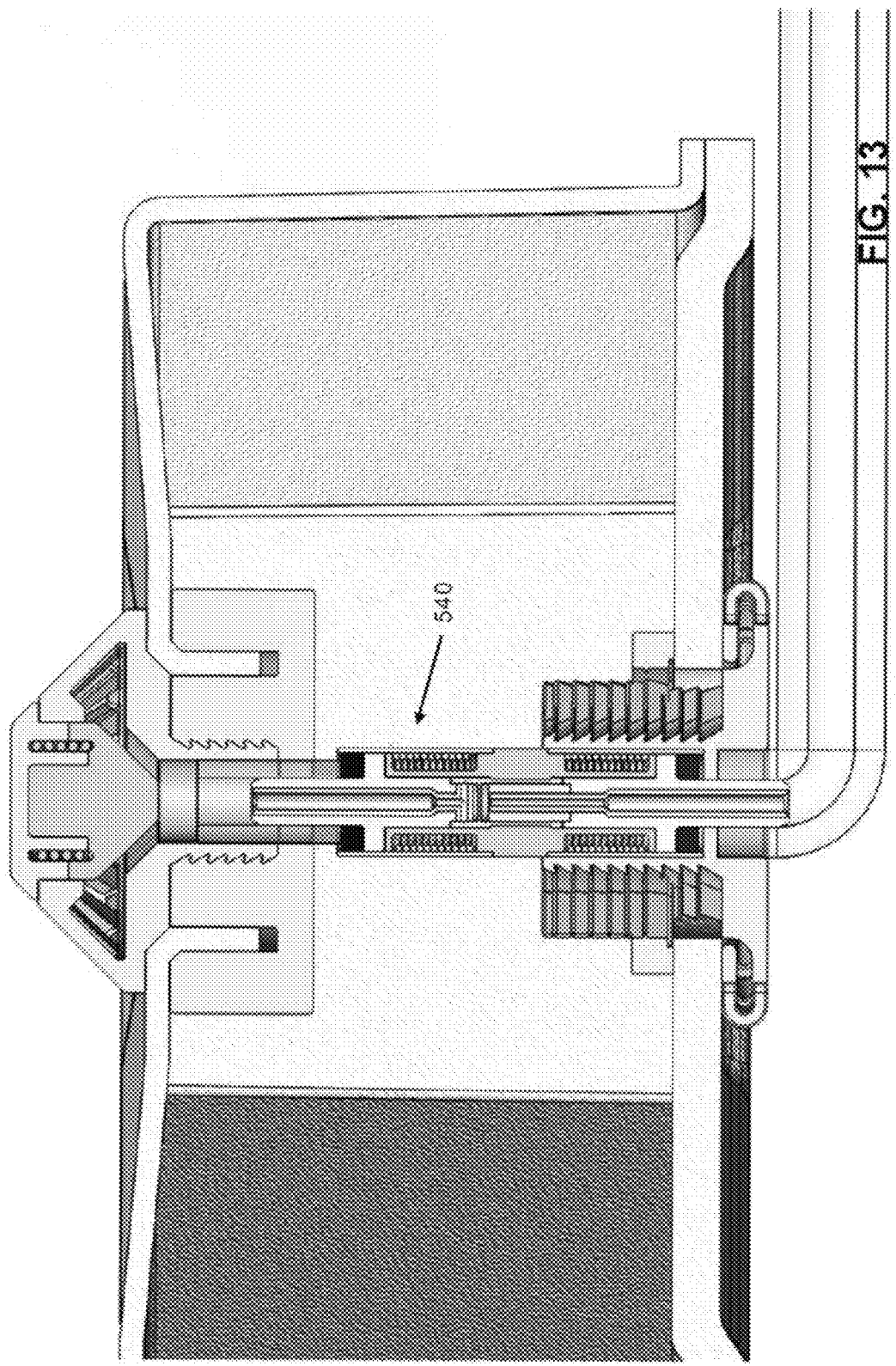
FIG. 13 illustrates a cross section view of an alternative exemplary cell usable with the helmet of FIG. 1, with the pressure valve positioned within the cell in accordance with one or more embodiments described herein.

FIGS. 7, 10, and 11 illustrate an exemplary pressure valve (540) for use with the helmet (10). In the present example, there are one or more pressure valves (540) in fluid communication with each of the cells (302). As shown in FIGS. 7 and 12, a first pressure valve (540) associated with the high-pressure system (510) is connected with the high-pressure line (442) that connects with cell (302). In this example, the pressure valve (540) is positioned in-line with the high-pressure line (442) 302). In yet other versions, for instance as shown in FIG. 13, the pressure valve (540) associated with the high-pressure system (510) can be positioned within the cell (302). In other versions, the high-pressure line (442) extends from the high pressure inlet (438) of the stud (424) to the pressure chamber (530) and the pressure valve (540) is located within the pressure chamber (530) where it connects with the high pressure line (442). In view of the teachings herein, other configurations for connecting the pressure valve (540) with the high-pressure line (442) so as to regulate gas flow through the high-pressure line (442) will be apparent to those of ordinary skill in the art.

As mentioned above, the low-pressure system (520) connects with each piston-cell (302). In the present example, other pressure valves (540) connect with the low-pressure inbound flow line (440), and yet other pressure valves (540) connect with the outbound low-pressure flow line (441). While in some versions the pressure valves (540) may be the same design and configuration whether or not used with the high-pressure system (510) or the low-pressure system (520), in other versions the pressure valves used with each system (510, 520) may differ.

Similar to the high-pressure line (442), for each piston-cell (302), the low-pressure lines (440, 441) extend from the low-pressure inlet (434) and low pressure outlet (436) of the stud (424) respectively to the pressure chamber (530). In some versions, the pressure valves (540) that connect with the low-pressure flow lines (440, 441) may be positioned in-line with the respective flow lines (440, 441) outside of the cell (302) and prior to the pressure chamber (530). In some other versions, the pressure valves are positioned within the pressure chamber (530) where they connect with their respective low-pressure flow lines (440, 441). In view of the teachings herein, other configurations for connecting the pressure valves (540) with the low-pressure lines (440, 441) so as to regulate gas flow through the low-pressure lines (440, 441) and within the cells (302) will be apparent to those of ordinary skill.

As mentioned above, the gas delivery system (500) comprises the high-pressure system (510), the low-pressure system (520), and the pressure chamber (530). With the high-pressure system (510), each of the high-pressure lines (442) connect with the pressure chamber (530). With the low-pressure system (520), each of the low-pressure inbound flow lines (440) and each of the low-pressure outbound flow lines (441) independently connect with the pressure chamber (530).

As discussed above, within each of the high-pressure system (510) and the low-pressure system (520), pressure valves (540) are used at select locations between the respective lines (442, 440, 441) and the pressure chamber (530). The pressure valves (540) are in electrical communication with the control system (600), such that the computer (606) controls the valve position within each of the variable pressure valves (540) to regulate the gas flow in a calculated manner as described further below. With the configurations described above, the pressure chamber (530) is configured to supply the gas, via the high-pressure line (442), to the valve assembly (400) of each cell (302). Similarly, the pressure chamber (530) is configured to supply the gas, via the low-pressure line (440), to each piston-cell (302). Also, the pressure chamber (530) is configured to receive gas, via the low-pressure line (441) of each piston-cell (302).

In one version, each cell (302) of the helmet (10) connects to a dedicated high-pressure line (442) and to a dedicated low-pressure inbound flow line (440) and dedicated low pressure outbound flow line (441). In other versions, a single high-pressure line (442) may connect to one or more piston-cells (302) in series or parallel. Similarly, a single low-pressure inbound flow line (440), and/or a single low-pressure outbound flow line (441) may connect to one or more cells (302) in series or parallel. Based on the configuration used, the number of pressure valves (540) used can be adapted to provide for variable control of the gas delivery system (500) accordingly.

Figure 14:
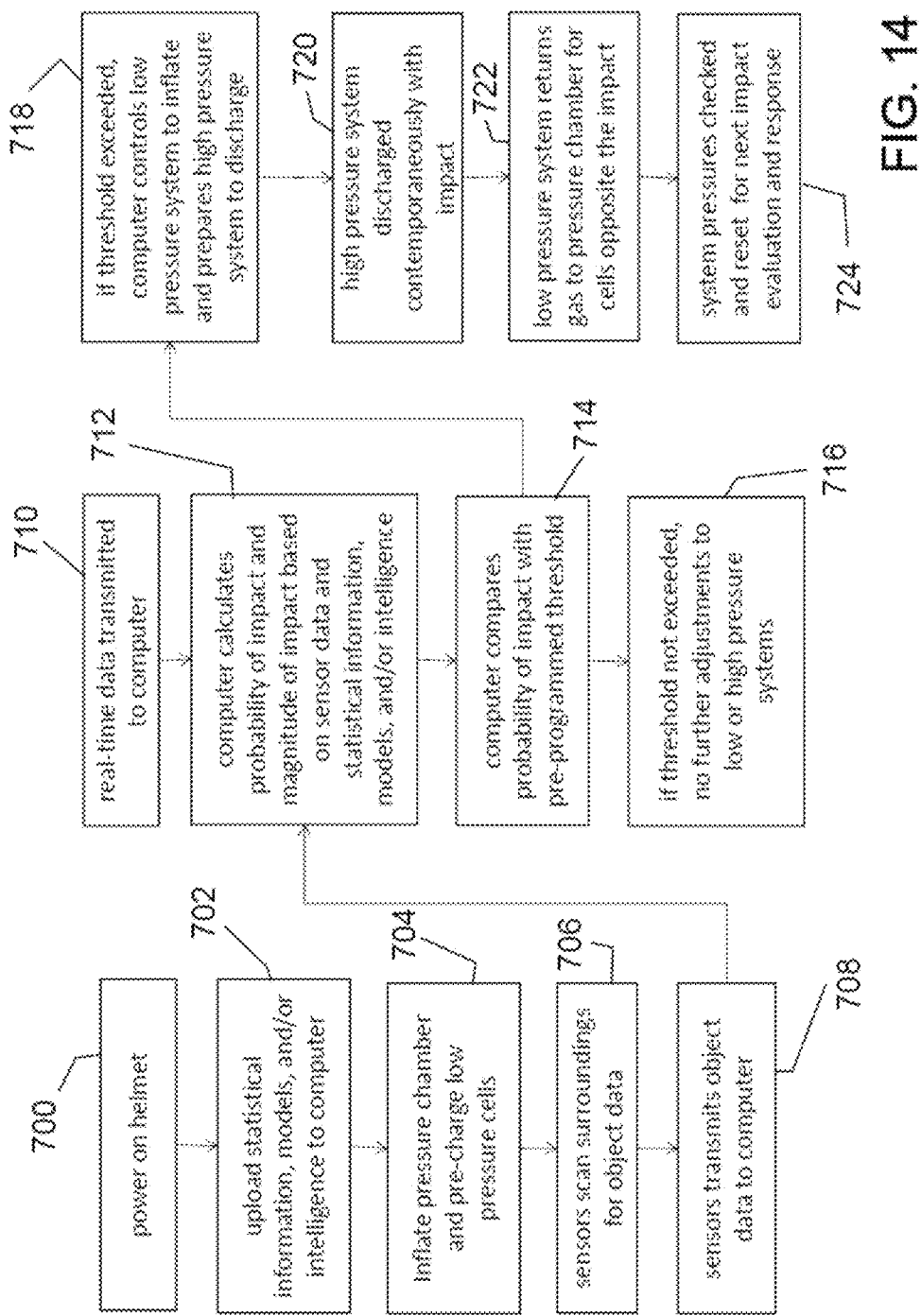
FIG. 14 illustrates a non-limiting exemplary set of steps used by the control system of the helmet of FIG. 1.

FIG. 14 depicts an exemplary set of steps for use with the helmet (10) in the context of a football game. Before the helmets are used in the game, the helmets (10) are powered on (700) so the computers (606) can be updated with various algorithms based on statistical information, statistical models, native knowledge and/or artificial intelligence related to the game. For example, data from past football games can be collected and mined to develop algorithms that relate to the probability of an impact for a particular player, or between or among players, based on their position on the field, their role (e.g. quarterback, running back, tight end, etc.), the offensive or defensive schemes or plays used, the time remaining in the game, etc. In view of the teachings herein, various algorithms that may be used will be apparent to those of ordinary skill in the art.

With this information, the computer (606) can be updated by uploading (702) these algorithms to the computer readable medium (610). In this example, these uploaded algorithms can later be used as the basis for the computer (606) calculating the probability of an impact.

When making the updates concerning the algorithms based on past game data, this information can be uploaded to the computer (606) wirelessly using the network adapter (612) or other wireless network communication technologies including, but not limited to, LIDAR, Bluetooth and/or NFC. Of course, this information may be uploaded using a wired connection instead of or in addition to wireless communication technology. For instance, the network adapter (612) may support a wired connection instead of or in addition to a wireless connection. In such an example using a wired connection the computer (606) can include one or more accessible ports (e.g., a USB port, a SD media slot, RJ-45, etc.) that are configured to connect with data cables or removable memory devices.

With the computer (606) updated with the desired information, before putting the helmets (10) into play, the pressure chambers (530) of each helmet are checked for inflation pressure and inflated if necessary (704). The pressure chambers (530) are each fitted with a pressure valve at the lower center rear of the helmet (not shown) that allows the pressure chamber (530) to be inflated or deflated as needed accessible from the outside of the helmet (10) such that a player wearing the helmet need not remove the helmet to inflate or recharge the pressure chamber (530). Also before the helmet (10) is put into play, the plurality of cells (302) are inflated to about 85% of their maximum capacity (704). In another implementation, the plurality of cells (302) are inflated to about 85% of their maximum capacity (704) to preload the system and enable a more rapid response to various threats of impact to the helmet device. In another non-limiting implementation, the system can be pre-loaded with gas pressure above and beyond the gas pressure determined to be required by the plurality of cells (302) to respond to a respective impact event. For instance, if the system determines that the plurality of cells need to be inflated to 85% of their maximum capacity to appropriately respond to an impact event, the system can be pre-loaded with 125% of the maximum capacity of the plurality of cells (302) to have an appropriate gas pressure to respond to the event as well as a reserve to address other impact threats before and/or after the impact occurs. As such, the pre-loading of the system can facilitate the near immediate deployment of gas to the high-pressure and low-pressure systems enabling a response to threat of impact before the impact occurs.

In view of the teachings herein, other maximum and initial inflation pressures that may be used for the plurality of cells (302) will be apparent to those of ordinary skill in the art. In the present example, this initial inflation of 85% of the maximum capacity is maintained throughout an event, such as a game, yet adjusted to be greater if called for based on the computer's (606) calculation as will be described further below. In another aspect, the initial inflation can be activated prior to the start of an event (e.g., sports game, military exercise, etc.). Furthermore, the system can be pre-loaded with 125% of the gas capacity quantum needed by the plurality of cells (302) to respective threats. Furthermore, in an aspect, during competition this preloaded 125% of gas capacity can allow for "blow-off" of pressure enabling full capacity deployment of pressure to both independent pressure systems and maintained throughout the game. The preloaded amount of gas capacity can also be adjusted to be greater than 125% if called for (e.g., up to 200%) to enable addressing every probability of threat scenario within a specific environment based on the computer's (606) calculation as will be described further below.

By inflating the plurality of cells (302) to this initial and constant target pressure mentioned above that is 85% of the maximum capacity, the response time is shortened in those instances where the system calls for a pressure change in the plurality of cells (302) to be something greater than or less than the 85% of maximum capacity. In other embodiments, by pre-loading the overall system to 85% capacity to respond to an event, this initial pre-game system pressure of 85% can be increased to 125% for in game competition to reduce the response time required to respond to an event (302). Thus, the pre-loading of the system to 125% gas pressure required by the maximum capacity can account for blow-by or loss of pressure required to maintain a 100% capacity to respond to an event, determined potential event, or multiple impact events.

In a non-limiting example, maximum capacity can be determined by determining the highest threat newton metric energy level of an anticipated impact event or multiple anticipated impact events simultaneously to limit the risk of concussion under a benchmark to limit or eliminate the multiple (determined or predicted) causes of impact. In an aspect, the system can employ a natural intelligence technology that enables the generation and/or processing of separate grids of data sets, such that each grid represents a different fragment of knowledge. For instance, in a non-limiting aspect, a grid of data can represent a fragment of knowledge such as a native intelligence of a game (i.e., football, lacrosse, winter sports, and so forth), native intelligence of a military task (for example multiple combat scenarios, police, national guard, motorcycle and bicycle riders, any industry not limiting and including any situation in which head trauma is possible), or other such knowledge fragments.

Furthermore, in an aspect, multiple grids of data sets representing fragments of knowledge can be processed in layered formats such as by category. In an aspect, one or more subsets of data from various grids can be aggregated into nodes representing aggregate fragments of knowledge from several grids. Furthermore, the data subsets of multiple nodes can be simultaneously processed to allow for improved and efficient execution of processing operations and can accelerate the processing of threat events from potential impacts by facilitating the generation and deployment of an attack plan after the occurrence of each respective impact (see systems II, systems III and systems IV herein).

In a non-limiting embodiment, natural intelligence operations can be executed by the smart helmet device, by processing multiple grids of archive and real-time incoming data (e.g., environmental data, object data, etc.) to accelerate the generation of a target helmet response to address a threat of impact or an actual impact. In an aspect, the "Natural Intelligence" (NI) technology can facilitate the generation of a protective response by the helmet device systems to various threats of impact to the helmet device. As such, the utilization of natural intelligence can prevent concussions and CTE injuries to users wearing the smart helmet device by neutralizing an impact to the smart helmet device as opposed to traditional reactionary solutions that merely absorb and deflect impacts. In another non-limiting embodiment, the cumulative grids and corresponding subsets of data representing fragments of knowledge can be structured as a spiral model in which the subsets of data correspond to time organized into a spiral formation. Accordingly, the smart helmet systems can process fragments of knowledge in accordance with its proximal time variance from an impact event occurring and based on the relevancy of such data to a determination of response to the impact. As such, relevant knowledge and the fragments of knowledge can correspond to nodes, where each node can represent a different knowledge fragment category and such knowledge fragment categories can juxtapose in time to form a node framework that prioritizes relevant usable knowledge. NI increases processing capacity speed because processor-oriented execution operations act on data subsets representing relevant knowledge rather than extraneous knowledge to solve the problem of anticipating helmet device responses to impact events. Normal impact hits can be understood to be those hits that have an impact energy beneath a threshold where a concussion is likely to occur from a hit in the absence of some other mitigating protective action. By way of example only, and not limitation, in one calculation it may be determined that the minimum energy from an impact where a concussion is likely to result is where the energy is equal to or exceeds a value in newton meters. In this scenario, the smart helmet device can employ NI to allow the helmet to intelligently respond to an impact event based on a value corresponding to the impact being greater than a threshold value corresponding to NI of highest relevance to respond to threats to the hardware systems of the helmet device to release gas to the variable high-pressure valves and low-pressure collective piston-cells responding before impact. In an aspect, NI enables speed and accuracy of only relevant fragments that become nodes of knowledge to enable time before an event occurs to present a solution and plan to identify and respond to the event[s] using an appropriate newton per square meter value. In some scenario's, 85% of the maximum capacity of the low pressure cells can be set at an appropriate newton per square meter value as a threshold value.

With the helmets (10) uploaded with current algorithms that provide the native intelligence of the design of the game, and with the pressure chambers (530) fully inflated and the low pressure cells (302) inflated to their target of 85% of maximum as described above, the helmets (10) are ready to be put into play. On the field in use, the sensors (602) scan the surroundings (706), collecting and generating data. More specifically, the sensors (602) identify the motion of surrounding objects, i.e. other players on the field, in terms of speed and direction. Additionally, the sensors (602) detect the size of the objects in motion. This size, direction, and speed data of the objects is at times herein referred to as the "object data." The object data collected by the sensors (602) is transmitted to the computer (606) (708).

In another aspect, the helmets (10) can be uploaded with current algorithms on one grid that provide the native intelligence of the design of the game, and multiple grids uploaded with present knowledge. Furthermore, additional grids can be provided that comprise input data and/or select real time data representing fragments of relevant data to the environment and context in which the helmet device is utilized and with which the pressure chambers (530) are to be fully inflated to 35% more capacity than required for the highest anticipation of events and multiple events. Furthermore, at half time the helmet device can recharge and check all systems to ensure that the helmets (10) (also referred to as helmet devices) are ready to be put into play. On the field in use, the sensors, collectively from all 22 helmets (602), can scan the surroundings (706), collect and generate data. More specifically, the collective sensors (602) (of several helmets) can identify the motion of players on the field in terms of speed and direction. Furthermore, the collective sensors (602) can identify the motion of players on the field by frequency or other such motion detection technology and discern players of each team to preserve the integrity of the game while at the same time providing input of data from the opposing team and individual players on the field, in terms of speed and direction and probability of an impact event occurring (e.g., using NI). Additionally, the sensors (602) detect the mass of the players and objects (i.e., football) in motion. This size, direction, and speed data of the objects is at times herein referred to as the "object data." In a non-limiting embodiment, the object data collected by the sensors (602) is transmitted to the off-field, off-environment, main processing computers by LIDAR (or other networking methods) both receiving and sending filtered NI relevant data (606) (708).

In some versions and exemplary uses, the helmet (10) allows for real-time data to be input into the computer[s] (606) (710) in addition to the object data from the sensors and several grids of fragments of knowledge as well as archived relevant knowledge (602). For instance, this occurs through transmitting the real-time data to the computers (606) of the helmets (10) using LIDAR or network adapters (612) of each helmet (10). For example, cumulative data from prior games isolating relevant knowledge of a team's play calls or offensive or defensive schemes and tendencies under specific situations and context in evaluation of each specific teams strengths and tendencies as well as over time gathering profile data on individual players filtered by relevance and transmitted to the computers (606). While such data can be used, it is not required in all example uses of the helmets (10).

With the object data as well as the optional real-time data, the computer (606) calculates the probability of an impact to the helmet (10) as well as the magnitude of that impact (712). In one example, the object data and/or real-time data may be used as inputs to variables in one or more of the algorithms filtered by relevant nodes of knowledge previously uploaded to the computer (606) to determine the probability and magnitude of impact by one or more of the objects (teams and individual player profiles and tendencies). In some versions, the object data and/or real-time data is not required to be an input to any of the algorithms previously uploaded to the computer (606). In such cases the object data and/or real-time data may be evaluated independently and compared to one or more of the statistical information, statistical models, and/or other intelligence of the game, which may include, but is not required to include, one or more algorithms in simpler game and/or environment situations and applications.

The calculated probability and magnitude of impact, is then compared with a pre-programmed threshold for probability and/or magnitude of impact (714). If the calculated probability and/or magnitude of impact does not exceed the pre-programmed threshold, then the gas delivery system (500) does not act (716), and the inflation of the high-pressure system low-pressure piston-cells (302) provides the protection for any most events/impacts that may occur. If the calculated probability of impact exceeds the pre-programmed threshold for probability of impact then the gas delivery system (500) is controlled to anticipate the impact and counteract the impact (718). However, in some embodiments, helmet (10) can utilize system II to enable the use of the opposite side of the helmet to contribute to attacking and neutralizing an impact event to mitigate the occurrence of injury (such as concussions) to a user.

In another non-limiting embodiment, a malleable inner shell can be employed in connection with a trickle current that can transform from the malleable inner shell to a non-malleable sphere structure. This enables energy at the point of impact to transmit through the sphere coming together at exactly the opposite location from the source of impact. In an aspect, sensors and NI can evaluate the location and energy required to release gas in the high-pressure valves (single valve located opposite the site of impact such as on the other side of helmet) release gas in parallel to the surface of the helmet with the surrounding high-pressure valves concentrically yet with increasing lower pressure releasing cumulative pressure against over 180 degrees of the inner side of the helmet in essence pushing off against the inside of the helmet. This energy is transmitted to the source location of one or more impact event contributing to the attacking force of Stage I.

In a similar manner, and in another non-limiting embodiment, the low-pressure piston-cells can inflate concentrically from the opposite point of impact within the helmet pushing off the inside of the helmet to transmit energy to support Stage I. Stage III involves sensors that monitor the movement of the brain within the cranium, inflating the piston-cells upon a determination using NI that the amount of energy to slightly inflate the piston-cells concentrically in order to buffer brain bruising that can occur after occurrence of an impact and potentially due to a brain hitting the inside of the persons cranium as well as stabilizing motion at the center of the brain (additional source of concussions). Stage IV can be external to helmet device and operates as a tether system. In some non-limiting embodiments, the tether system can include four tethers connecting the helmet to four strategic connections on the shoulder pads to prevent head snap concussions. For example, if a quarterback's head hits the ground from being sacked, the tethering system can enable a complete evaluation of the 'Z' axis data to prevent a more severe head-snap from occurring. Stage IV, like the trick current mechanism, can change the physical characteristics from malleable (to not interfere with the integrity of the game) to varying elastomer resistance determined by NI processing the grids of relevant knowledge based on anticipation of occurrence of an impact event where Stage IV comes into play.

In some examples, whether or not the gas delivery system (500) is controlled to anticipate the impact and counteract the impact can be based on a combination of the probability of the impact combined with the magnitude of the impact, rather than just the probability of impact alone. For example, the gas delivery system (500) may take action in a scenario where the calculated probability of impact is lower, but the calculated magnitude of impact is above a concussion causing level.

In view of the teachings herein, other ways to control the gas delivery system (500) to take action to counteract an impact based on the calculated probability of impact and magnitude of that impact compared to pre-programmed thresholds will be apparent to those of ordinary skill in the art.

In the scenario where the pre-programmed threshold for probability of impact and/or magnitude of impact is exceeded, NI can be used in connection with the computer (606) which in turn can control the variable gas delivery system (500) so that before the release of gas through the high pressure system (510), a number of low pressure cells (302) that surround the anticipated impact location are further inflated. This further inflation is to counter the energy that will be released from the valve assemblies (400) by way of the high-pressure system (510), but this counter of energy is done over a greater surface area. In the present example, the increase in the energy in these cells (302) is such that the cumulative energy in these cells (302) matches the energy that will be released from the valve assembly (400) by way of the cumulative combined energy from the high-pressure and low-pressure system (510).

By way of further example, and not limitation, based on the object data from the sensors (602) and NI control of the grids of fragments of knowledge in determining relevant nodes of knowledge, the location of the predicted impact is known. For instance, the particular cell or cells (302) where the impact will occur is identified. This can be referred to as the "impact location." With this information, those cells (302) that are positioned at and around the impact location are inflated concentrically with the center having the highest release of gas/energy. In the present example, those low-pressure piston-cells (302) that are further inflated encompass those cells (302) around and including the impact location extending in a concentric fashion to cover about half of the surface area of the protective layer (300). In other words, the further inflated cells (302) encompass about 180 degrees around the helmet (10). Thus, for example, if the impact location was determined to be in the center of the right side of the helmet (10), all those cells (302) on the right side half of the helmet (10) would be further inflated.

In the present example, the amount of further inflation for the low-pressure cells (302) is calculated such that the cumulative energy of those cells (302) further inflated is about equal to the energy calculated to be released through the one or more valve assemblies by the high-pressure system (510) as will be described below. By way of example only, and not limitation, in a helmet (10) having seventy cells (302) in total where half of the cells (302) would further inflate based on an anticipated impact, the energy within each of the thirty-five further inflated cells (302) is summed to arrive at the cumulative energy, which is configured to match that energy to be released from the one or more valve assemblies (400) by the high pressure system (510) to counteract the anticipated energy of the impact. So, if one valve assembly (400) is to release 1,000 newton meters of energy, the cumulative energy in the surrounding thirty-five cells (302) should equal about 1,000 newton meters, which would equate to each of those thirty-five cells (302) having an energy of about 28.5 newton meters.

At about the same time as the control system (600) is further inflating certain low pressure cells (302), the NI control system (600) comes into play if the energy reassured to attach the source of threat is determined to be higher than the capacity of the grouping (concentric grouping with the center at point of contact and concentrically less pressure engaging 180 degrees of surface area with NI processing the exact energy to be released in the high-pressure valve system at the center or at the point of anticipated contact—preparing the high pressure system (510)(718). The purpose of the high-pressure system (510) is to release an equal amount of energy in the specific location of the anticipated impact at the time of the impact. To do this, the high-pressure system (510), by NI, anticipates the location and total force of impact attacking the threat of impact before the threat comes in contact with the helmet, releasing an amount of gas calculated by NI to counter the energy of the anticipated impact (720).

Based on the identified impact location as discussed above, the NI control system (600) selects which one or more valve assemblies (400) from the respective one or more cells (302) to prepare for use by the high-pressure system (510). For example, in a non-limiting embodiment, based on NI relevant nodes of knowledge generated from real-time data, archive data, native intelligence, and/or other grid data representing fragments of knowledge, an NI control system can rapidly instruct the computer (606) to perform operations that anticipate the projected location of an impact, a projected speed of impact, a projected mass of the impacting object, and so forth calculating where impact or multiple events will hit and the amount of energy required for release to keep the impact below a target or benchmark level. In some versions this energy may be calculated as the kinetic energy of the object using the equation $E=\frac{1}{2} \times m \times v^2$, where E is energy in newton meters, m is the object's mass in kilograms, and v is the object's velocity in meters per second.

With the energy of the impact calculated, an NI control system, in some non-limiting embodiments, can direct the computer (606) to release a target quantity of gas and a system location in which to release such, such as a valve assembly and piston-cell (400). As such, the compressed gas can be released into the collective four stages (if required to keep below benchmark) (400), such that an amount of energy is released that matches the calculated energy of the impact.

To account for blow-by and any other losses generally, in the present example the NI control system can control the release of gas in the high-pressure system and low-pressure systems such that 130% of the calculated energy from the impact is available to match 100% of the compressed gas from the pressure chamber (530) to the valve assemblies (400). With the amount of compressed gas determined, the NI control system can open and close those valves (540) necessary to provide the air amount from the pressure chamber (530) to the valve assembly (400). At the time of the projected impact, the NI control system can controls the valve assembly to move the plunger (414) from a closed position as shown in FIG. 8, to an open position as shown in FIG. 9, to release the gas and the energy to oppose the energy from the impact (720).

Also in the present example, In Stage II, on the inside of the helmet (10) opposite of where the impact occurs, the NI control system can direct a low pressure release of gas from the remainder of the piston-cells, inflating concentrically from highest inflation at the piston-cell directly opposite the impact site on the other side of the helmet (302) that were not further inflated as described above. The gas released from these cells (302) uses the outbound flow low pressure line (441) to send gas from the cells (302) back to the pressure chamber (530). Providing for this opposite side release of pressure aides in buffering the motion effect to stabilize the cranium to helmet (10) overall positioning.

After the high pressure system (510) has discharged, the control system (600) checks the gas delivery system (500) pressures and makes adjusts if needed to return the helmet (10) to an initial state where the plurality of cells (302) of the protection layer (300) are inflated to about 85% of their maximum capacity (722). At this point the control system (600) repeats the impact evaluation process shown in FIG. 14 beginning with the sensors (602) scanning the surroundings for object data (706).

To continually improve anticipation of impacts, data captured during a game from each helmet (10) is analyzed. The computer (606) may be configured to store data in the computer readable medium (610) about the functions of the helmet (10) during the game. This data may be retrieved from each helmet (10) and used individually and collectively with artificial intelligence or other modeling techniques to make adjustments to the algorithms and/or calculations used with the helmet (10) to determine impact probability and magnitude. Where such improvements are made, updates can be uploaded to the helmets (10) before the next use (702).

In another embodiment, disclosed herein is a computer-implemented method comprising receiving, by a processor operatively coupled to a helmet device, helmet data comprising at least one of statistical data, statistical models, or natural intelligence algorithms; inflating, by a gas delivery system of the helmet device, a pressure chamber element of the helmet device based on the helmet data; and scanning, by a sensor system of the helmet device, surrounding environments of the helmet device for object data. In another non-limiting embodiment the computer-implemented method can further comprise receiving, by the processor operatively coupled to a helmet device, real-time data or the object data.

In yet another non-limiting embodiment, the computer-implemented method can further comprising determining, by the processor, a probability of impact to the helmet device based on the sensor data and the helmet data. Furthermore, the computer-implemented method can further comprise comparing, by the processor, the probability of impact to a pre-programmed threshold for probability or impact. In another aspect, the computer-implemented method can further comprise inhibiting, by the processor, a triggering of inflation of inflatable cells of the helmet device based on the comparing the probability of impact being less than the pre-programmed threshold. In yet another aspect, the computer-implemented method can further comprise triggering, by the processor, an inflation of inflatable cells via a set of low-pressure valves of the gas delivery system of the helmet device based on the comparing the probability of impact being greater than the pre-programmed threshold.

Furthermore, in an aspect, the computer-implemented method can further comprise triggering, by the processor, a discharge of pressure from the inflatable cells via a set of high pressure valves of the gas delivery system contemporaneously with an impact to the helmet device. In yet another aspect, the computer-implemented method can further comprise triggering, by the processor, a disposition of gas, by the set of low-pressure valves of the helmet device, used to inflate the inflatable cells into the pressure chamber after the impact to the helmet device occurs. In yet another non-limiting embodiment, the computer-implemented method can further comprise monitoring, by the processor, the gas delivery system of the helmet device for calibration criteria required to return the helmet device to an initial state.

In another aspect, the computer-implemented method can further comprise, performing, by the processor, an impact evaluation operation based on sensors of the helmet device scanning a surrounding environment of the helmet device for object data. In another aspect, the computer-implemented method can further comprise triggering, by the processor, a scanning of a surrounding environment of the helmet device for object data. Furthermore, in an aspect, the computer-implemented method can further comprise triggering, by the processor, an adjustment of the gas delivery system to inflate the inflatable cells to the initial state.

While the above example is set in a sporting example, and in particular a football game, the helmet (10) can have many other applications that will be apparent to those of ordinary skill in the art in view of the teachings herein. These other applications may include, among other things, other sports, military environments, or various employment jobsites like construction, etc. In view of the teachings herein, those of ordinary skill in the art will understand how to configure the impact probability determination and appropriate response anticipating an impact in such other applications as noted above and otherwise.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

For simplicity of explanation, any computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art can understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, various aspects and features of the helmet are performed by components executed by a processor established from a combination of electrical and mechanical components and circuitry, a human is unable to replicate or perform the subject data packet configuration and/or the subject communication between processing components and/or a determination component. Furthermore, helmet data associated with activity related to the helmet or user can be generated, transformed, and mapped to other systems. The access to such helmet data is accessed from a memory where such access patterns a human are unable to replicate.

Also, the systems and methods disclosed herein can be integrated with the tangible and physical systems of helmets and helmet hardware and other such physical helmet components. Furthermore, the generation of data associated with a helmet system cannot be performed by a human. For example, a human is unable to generate learned data from a helmet and helmet user activities vehicle, and utilize a personalized preference of one or more users, accurately and precisely sense environmental conditions. Furthermore, a human is unable to communicate helmet data and/or packetized data for communication between a main processor (e.g., using a processor) and a memory.

Figure 15:
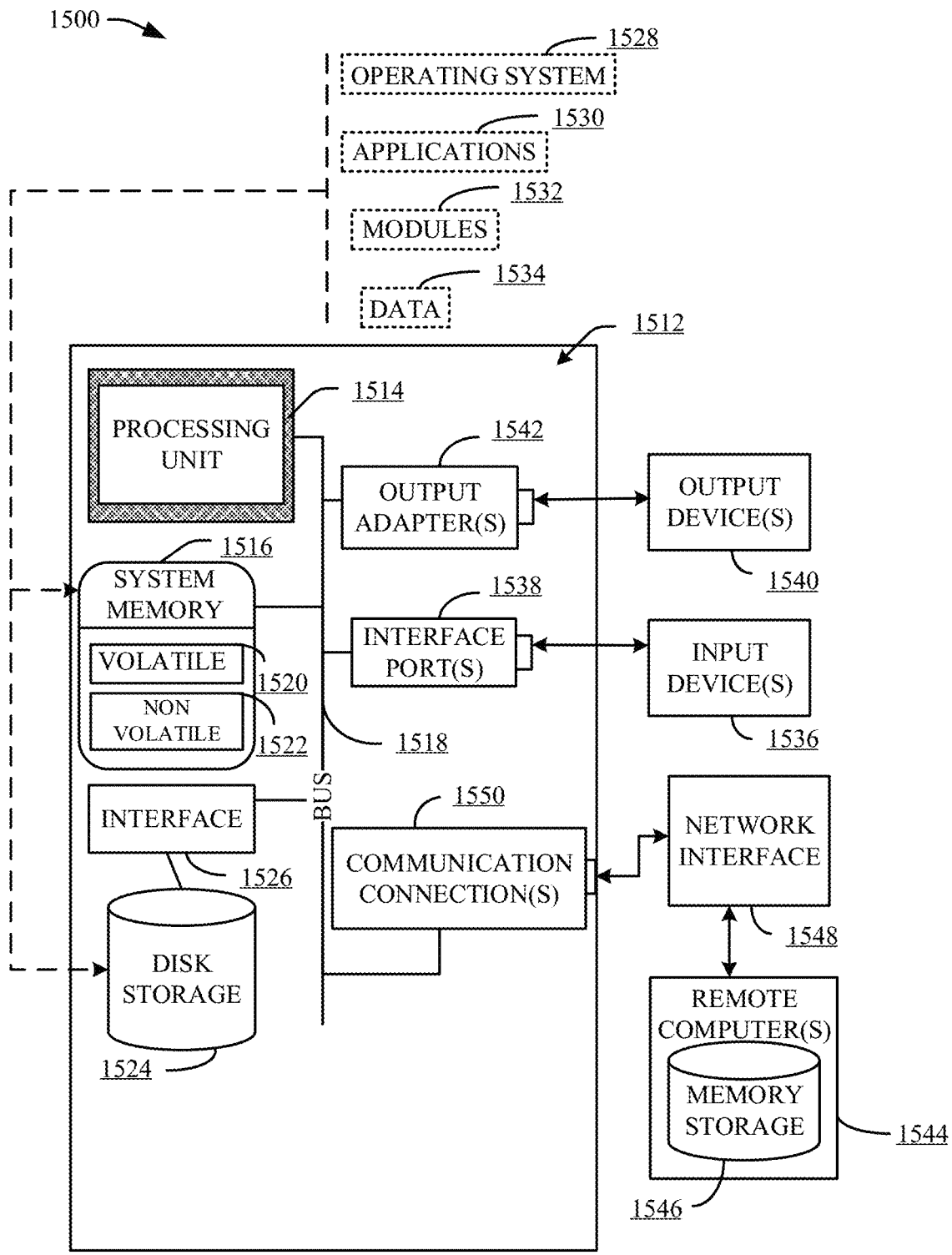
FIG. 15 illustrates a block diagram of an example, non-limiting system and network environment in which one or more embodiments described herein can be facilitated.

In order to provide a context for the various aspects of the disclosed subject matter, FIG. 15 as well as the following discussion is intended to provide a general description of a suitable environment in which the various aspects of the disclosed subject matter can be implemented. FIG. 15 illustrates a block diagram of an example, non-limiting operating environment in which one or more embodiments described herein can be facilitated. With reference to FIG. 15, a suitable operating environment 1500 for implementing various aspects of this disclosure can also include a computer 1512. The computer 1512 can also include a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514. The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1516 can also include volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1520 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1512 can also include removable/non-removable, volatile/nonvolatile computer storage media. FIG. 15 illustrates, for example, a disk storage 1524. Disk storage 1524 can also include, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1524 to the system bus 1518, a removable or non-removable interface is typically used, such as interface 1526. FIG. 15 also depicts software that acts as an intermediary between users and the basic computer resources described in the suitable operating environment 1500. Such software can also include, for example, an operating system 1528. Operating system 1528, which can be stored on disk storage 1524, acts to control and allocate resources of the computer 1512.

System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems. A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port can be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a computer, a server, a router, a network PC, a workstation, a microprocessor based appliance, a peer device or other common network node and the like, and typically can also include many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1550 refers to the hardware/software employed to connect the network interface 1548 to the system bus 1518. While communication connection 1550 is shown for illustrative clarity inside computer 1512, it can also be external to computer 1512. The hardware/software for connection to the network interface 1548 can also include, for exemplary purposes only, internal and external technologies such as, modems including regular telephone grade modems, cable modems and DSL modems, ISDN adapters, and Ethernet cards.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system comprising
a memory that stores computer executable components;
a processor, operatively coupled to a target helmet device, wherein the processor executes the computer executable components stored in the memory, wherein the computer executable components comprise:

a receiving component configured to receive a set of helmet data corresponding to the target helmet device and at least another helmet device, wherein the helmet data represents knowledge of anticipated impacts from multiple helmet devices;

a first generation component configured to generate a set of nodes comprising knowledge data grids, wherein each knowledge data grid represents a fragment of archived categorical information relevant to threat events from a potential impact to the target helmet device;

a determination component configured to determine a relevancy level of the knowledge data grids to the threat events from the potential impact based on a comparison of a relevancy value corresponding to a knowledge data grid to a threshold value representing a threshold correlation between the knowledge data grid and an occurrence of a concussion from the potential impact;

an organization component configured to organize the set of nodes into a spiral formation framework that correlates nodes of the set of nodes according to the relevancy level and proximal time variance from the threat events;

an evaluation component configured to evaluate the knowledge data grids according to a prioritization hierarchy based on the determined relevancy level and the proximal time variance to the threat events from the potential impact, wherein a highest determined relevancy level is evaluated prior to lower determined relevancy level;

a second generation component configured to generate a protective response of the target helmet device based on execution of natural intelligence operations comprising operations executed by the first generation component, the determination component, the organization component and the evaluation component, wherein the protective response comprises; and a gas delivery component configured to inflate a pressure chamber element of the target helmet device based on the natural intelligence operations.

2. A computer-implemented method comprising:

receiving, by a processor operatively coupled to a target helmet device, a set of helmet data corresponding to the target helmet device and at least another helmet device, wherein the helmet data represents knowledge of anticipated impacts from multiple helmet devices;

executing, by the processor, natural intelligence operations on the helmet data, wherein the natural intelligence operations comprise:

generating, by the processor, a set of nodes comprising knowledge data grids, wherein each knowledge data grid represents a fragment of archived categorical information relevant to threat events from a potential impact to the target helmet device;

determining, by the processor, a relevancy level of the knowledge data grids to the threat events from the potential impact based on a comparison of a relevancy value corresponding to a knowledge data grid to a threshold value representing a threshold correlation between the knowledge data grid and an occurrence of a concussion from the potential impact;

organizing, by the processor, the set of nodes into a spiral formation framework that correlates nodes of the set of nodes according to the relevancy level and proximal time variance from the threat events;

evaluating, by the processor, the knowledge data grids according to a prioritization hierarchy based on the determined relevancy level and the proximal time variance to the threat events from the potential impact, wherein a highest determined relevancy level is evaluated prior to a lower determined relevancy level;

generating, by the processor, a protective response of the target helmet device based on the natural intelligence operations, wherein the protective response comprises:

inflating, by a gas delivery system of the target helmet device, a pressure chamber element of the target helmet device based on the natural intelligence operations.

3. The computer-implemented method of claim 2, further comprising receiving, by the processor operatively coupled to the target helmet device, real-time data or object data detected by a sensory system of the target helmet device, wherein the object data represents surrounding environments of the target helmet device.

4. The computer-implemented method of claim 2, further comprising determining, by the processor, a probability of impact to the target helmet device based on sensor data, the natural intelligence operations, and the target helmet data.

5. The computer-implemented method of claim 4, further comprising:

comparing, by the processor, the probability of impact to a pre-programmed threshold for probability or impact; and determining, by the processor, whether the probability of impact is greater than or is less than the pre-programmed threshold for probability of impact based on the comparing.

6. The computer-implemented method of claim 5, further comprising:

inhibiting, by the processor, a triggering of inflation of inflatable cells of the target helmet device based on a determination that the probability of impact is less than the pre-programmed threshold.

7. The computer-implemented method of claim 5, further comprising:

triggering, by the processor, an inflation of inflatable cells via a set of low-pressure valves of the gas delivery system of the target helmet device based on a determination that the probability of impact being is greater than the pre-programmed threshold.

8. The computer-implemented method of claim 7, further comprising triggering, by the processor, a discharge of pressure from the inflatable cells via a set of high pressure valves of the gas delivery system contemporaneously with an impact to the target helmet device.

9. The computer-implemented method of claim 8, further comprising triggering, by the processor, a disposition of gas, by the set of low-pressure valves of the target helmet device, used to inflate the inflatable cells into the pressure chamber after the impact to the target helmet device occurs.

10. The computer-implemented method of claim 9, further comprising monitoring, by the processor, the gas delivery system of the target helmet device for calibration criteria required to return the target helmet device to an initial state.

11. The computer-implemented method of claim 10, wherein the initial state represents an inflation of the inflatable cells to approximately one hundred twenty five percent of inflation capacity.

12. The computer-implemented method of claim 10, further comprising performing, by the processor, an impact evaluation operation based on sensors of the target helmet device scanning a surrounding environment of the target helmet device for object data.

13. The computer-implemented method of claim 2, further comprising triggering, by the processor, a scanning of a surrounding environment of the target helmet device for object data.

14. The computer-implemented method of claim 10, further comprising triggering, by the processor, an adjustment of the gas delivery system to inflate the inflatable cells to the initial state.

15. The computer-implemented method of claim 2 further comprising:
    identifying, by sensors of the target helmet device, motion of players based on a speed of a player movement, size of the player, and direction of movement of the player; and
    executing, by the processor, the natural intelligence operations on speed of the player movement data, size of the player data, and direction of movement of the player data to generate the protective responses.

16. The computer-implemented method of claim 2, wherein the natural intelligence operations further comprise:
    procuring, by the processor, native intelligence insights from the set of knowledge data grids, wherein the native intelligence comprises a design of a football game, opponent game play tendencies, team strengths, player relevance, and continuously updated fragments of updated data associated with an environment of the target helmet device.

17. The computer-implemented method of claim 2, wherein the natural intelligence operations increase processing capacity of the target helmet device based on the natural intelligence operations executing relevant knowledge within the knowledge data grid rather than extraneous knowledge.

18. The computer-implemented method of claim 2, wherein the evaluating, by the processor, the knowledge data grids occur simultaneously and based on the evaluating the method further comprises:
    determining, by the processor, a plan for the target helmet device to mitigate potential damage from the potential impact of the threat events; and
    adding fragments of knowledge to the knowledge data grids or other knowledge data grids to the set of nodes based on continuous updated helmet data.

19. The computer-implemented method of claim 9, further comprising:
    determining, by the processor, an inflation level as the initial state based on an updated scanning of the surrounding environments and the natural intelligence operations.

20. The computer-implemented method of claim 2, wherein the target helmet device further comprises a malleable inner shell layer configured to transform into a malleable sphere structure based on a trickle current applied to the malleable inner shell layer.

* * * * *